United States Patent
Xu et al.

(10) Patent No.: US 12,486,525 B2
(45) Date of Patent: Dec. 2, 2025

(54) METHODS FOR INCREASING PRODUCTIVITY OF THERAPEUTIC PROTEINS

(71) Applicant: BRISTOL-MYERS SQUIBB COMPANY, Princeton, NJ (US)

(72) Inventors: Jianlin Xu, Devens, MA (US); Shun Zheng, Waltham, MA (US); Zeinab H Dawood, Devens, MA (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 412 days.

(21) Appl. No.: 18/245,753

(22) PCT Filed: Sep. 21, 2021

(86) PCT No.: PCT/US2021/051185
§ 371 (c)(1),
(2) Date: Mar. 17, 2023

(87) PCT Pub. No.: WO2022/066595
PCT Pub. Date: Mar. 31, 2022

(65) Prior Publication Data
US 2023/0357815 A1     Nov. 9, 2023

Related U.S. Application Data

(60) Provisional application No. 63/225,832, filed on Jul. 26, 2021, provisional application No. 63/081,380, filed on Sep. 22, 2020.

(51) Int. Cl.
*C12P 21/06* (2006.01)
*C07K 16/00* (2006.01)

(52) U.S. Cl.
CPC ............ *C12P 21/06* (2013.01); *C07K 16/00* (2013.01); *C07K 2317/14* (2013.01)

(58) Field of Classification Search
CPC .......... C12P 21/02; C12P 21/06; C12N 9/485; C12Y 304/16–18
See application file for complete search history.

(56) References Cited

U.S. PATENT DOCUMENTS

| 5,126,250 A | 6/1992 | McDonough et al. |
| 2014/0255993 A1 | 9/2014 | Follstad et al. |

FOREIGN PATENT DOCUMENTS

| WO | 2013/060867 A2 | 5/2013 |
| WO | 2013067301 A1 | 5/2013 |
| WO | 2014139608 A1 | 9/2014 |
| WO | 2017053482 A1 | 3/2017 |
| WO | 2018073717 A1 | 4/2018 |

OTHER PUBLICATIONS

ProteinSimple "Analysis of Monoclonal Antibodies with Carboxypeptidase B" protocol PL7-0018 Rev B, 2018, 3 pages (Year: 2018).*

Jianlin Xu, et al., "Productivity improvement and charge variant modulation for intensified cell culture processes by adding a carboxypeptidase B (CpB) treatment step", Biotechnology and Bioengineering, 2021, 118:3334-3347 .

Jun Luo, et al., "Probing of C-Terminal Lysine Variation in a Recombinant Monoclonall Antibody Production Using Chinese Hamster Ovary Cells With Chemically Defined Media", Biotechnology and Bioengineering, vol. 109, No. 9, Sep. 2012, pp. 2306-2315 .

Weijian Zhang, et al., "Investigation into the impact of tyrosine on the product formation and quality attributes of mAbs in rCHO cell cultures", Biotechnology Products and Process Engineering, 2020, 104:6953-6966.

Kim, Do Gyun, et al., "Effects of carboxypeptidase B Treatment and elevated temperature on recombinant monoclonal antibody charge variants in cation-exchange chromatography analysis", Arch. Pharm. Res. (2016) 39:1472-1481.

* cited by examiner

*Primary Examiner* — Thane Underdahl
(74) *Attorney, Agent, or Firm* — Xiangyu Liu

(57) ABSTRACT

The present invention generally relates to a method of producing a therapeutic protein of interest secreted from host cells cultured in a bioreactor through adding a carboxypeptidase to the cell culture.

16 Claims, 14 Drawing Sheets

METHODS FOR INCREASING PRODUCTIVITY OF THERAPEUTIC PROTEINS

CROSS-REFERENCE TO RELATED APPLICATIONS

This application claims priority to U.S. Provisional Application Ser. No. 63/081,380, filed Sep. 22, 2020 and U.S. Provisional Application Ser. No. 63/225,832, filed Jul. 26, 2021, the entire contents of which is incorporated herein by reference.

FIELD OF THE INVENTION

The present invention generally relates to methods for producing a therapeutic protein of interest secreted from host cells.

BACKGROUND OF THE INVENTION

Therapeutic proteins become more popular in treatment of multiple human diseases. They are known to bear certain heterogeneity during the manufacturing due to a wide range of post-translational modifications. Among them, charge variant species (acidic species, main peak and acidic species) were very commonly observed, for example, in monoclonal antibodies (mAbs)(Hintersteiner et al., 2016). From the regulatory point of view, higher basic species derived from C-terminal lysines are less concerned, because they will be rapidly cleaved by endogenous serum carboxypeptidase B (CpB) after intravenous injection to patients, with estimated half-lite of as short as an hour (Brorson & Jia, 2014). Nevertheless, charge variants still need to be monitored to ensure manufacturing consistency and product comparability (Chung et al., 2019). Main peak is required to control in the release specification of mAb products. Successful control of manufacturing process is critical for ensuring therapeutic protein product quality, safety and lot-to-lot consistency.

C-terminal lysine variants at mAb heavy chains with zero, one or two residual lysine during the mAb manufacturing process were believed to result from non-efficient cleavage of C-terminal lysine residues by endogenous carboxypeptidases (Zhang et al., 2015). More Lysine residuals increase the proportion of basic species in charge variant profile, as lysine is positively charged thus lowers the PI of the mAb molecules (Bronson et al., 2014). To reduce the heterogeneity of the mAb C-terminal lysine in manufacturing process, one solution was to culture the host cells with a shorter time period at the production stage. However; this method significantly reduced the productivity of the mAb.

Therefore; an improved cell culture method to increase the therapeutic protein productivity with a higher titer and less heterogeneity needs to be developed.

SUMMARY OF THE INVENTION

In certain embodiments of this invention, a cost-effective enzyme treatment strategy was developed by implementing CpB treatment directly in the bioreactor at the end of the upstream cell culture process. This strategy was chosen for a number of advantages. First, cell culture conditions are usually comparable with the enzyme reaction conditions in terms of temperature, pH, mixing, etc., so that there is no additional condition adjustment needed after adding CpB. CpB was introduced before a series of downstream purification steps; and it is easy to get CpB removed during the subsequent purification processes. It was shown that the Protein A step could remove the introduced CpB under the detectable limit by an ELISA assay even when the enzyme was added at 50× its working concentration. These greatly simplifies the overall process with improved titers while achieving the goal of producing qualified therapeutic protein products.

In certain embodiments of the invention, this disclosure provides a method producing a therapeutic protein of interest, comprising: a) culturing host cells expressing the protein under optimized culture conditions in a bioreactor for at least 6 days; b) adding a carboxypeptidase (CP) to the cultured cells; c) collecting clarified bulk (CB); and d) subjecting the clarified bulk to a purification process.

In certain embodiments of the invention, this disclosure provides a method of improving productivity of a therapeutic protein of interest; comprising: a) culturing host cells expressing the protein under optimized culture conditions in a bioreactor for at least 6 days; b) adding a carboxypeptidase (CP) to the cultured cells; c) collecting clarified bulk (CB); and d) subjecting the clarified bulk to a purification process.

In certain aspects of the invention, the bioreactor is a production bioreactor.

In certain aspects of the invention, the protein is a protein having a lysine or arginine residue in the C-terminus.

In certain aspects of the invention, the protein is a Fc-fusion protein or an antibody.

In certain aspects of the invention, the antibody is a mAb.

In certain aspects of the invention, the carboxypeptidase is selected from Carboxypeptidase. A (CPA), Carboxypeptidase B (ChB), Carboxypeptidase D (CPD), Carboxypeptidase H (CPH), Carboxypeptidase E (CPE), Carboxypeptidase M (CPM), Carboxypeptidase N (CPN), Carboxypeptidase T (CPT), Carboxypeptidase Y (CPY), Carboxypeptidase M32, Glutamate carboxypeptidase (GCP), Prolyl arboxypeptidase (PCP), D-alanyl-D-alanine carboxypeptidase (AACP) or Procarboxypeptidase.

In certain aspects of the invention, the carboxypeptidase is carboxypeptidase B.

In certain aspects of the invention, the cells are cultured for about 14 days

In certain aspects of the invention, the carboxypeptidase is added during the production stage of the cultured cells.

In certain aspects of the invention, the carboxypeptidase is abided to the cultured cells between 0 to 24 hours before harvest.

In certain aspects of the invention, the carboxypeptidase is added to the cultured cells about 2 hours before harvest.

In certain aspects of the invention, the carboxypeptidase is added to the cultured cells at harvest.

In certain aspects of the invention, wherein the cells are in a perfusion, a batch or a fed batch cell culture.

In certain aspects of the invention, the carboxypeptidase is added in an amount sufficient to reduce the basic species of the protein.

In certain aspects of the invention, the carboxypeptidase is added at a ratio between 0.001% to 1% w/w of CP:protein of interest. In certain aspects of the invention, the carboxypeptidase is added more than once to the production bioreactor.

In certain aspects of the invention, the host cells are CHO cells.

In certain aspects of the invention, the antibody binds an antigen selected from the group consisting of PD-1, PD-L1, CTLA-4, LAG-3, TIGIT, GITR, CXCR4, CD73 HER2, VEGF, CD20, CD40, CD11a, tissue factor (TO, PSCA, IL-8, IL-13, SARS-CoV-2 spike protein, EGFR, HER3, and HER4.

In certain aspects of the invention, the mAb is Nivolumab.

BRIEF DESCRIPTION OF THE DRAWINGS

(FIG. 2A) Process B (n=4), (FIG. 2B) Process C (n=4), and (FIG. 2C) Process D (n=2: batch1 and batch2 separately), respectively. Due to the very small standard deviation, the error bars are not observed in some time points.

(FIG. 3A) Process B (n=4), (FIG. 3B) Process C (n=4), and (FIG. 3C) Process D (n=2: batch1 and batch2 separately), respectively. Due to the very small standard deviation, the error bars are not observed in some time points.

DETAILED DESCRIPTION OF THE INVENTION

Figure 1A:
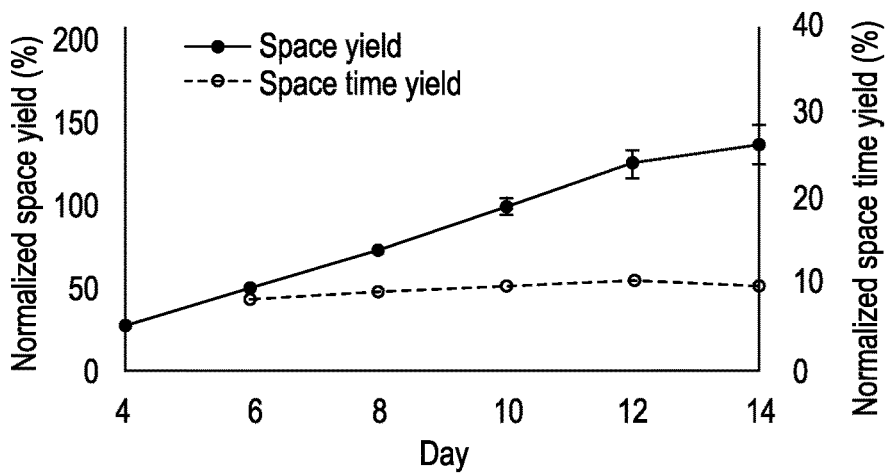
FIG. 1A, FIG. 1B and FIG. 1C show CHO cell culture production performance for mAb-1 in lab bioreactors: normalized space yield (solid lines, normalized to the average of day 10 titer for Process B as 100%) and normalized space time yield (dashed lines, calculated based on the normalized titer over the duration) for (FIG. 1A) Process B (intensified fed-batch production using enriched N-1 seed) (n=4), (FIG. 1B) Process C (intensified fed-batch production using perfusion N-1 seed) (n=4), and (FIG. 1C) Process D (intensified perfusion production) (n=2: batch1 and batch2 separately), respectively. Due to the very small standard deviation, the error bars are not observed in some time points.

This invention provides a method producing a therapeutic protein of interest, comprising: a) culturing host cells expressing the protein under optimized culture conditions in a bioreactor for at least 6 days; b) adding a carboxypeptidase to the cultured cells; c) collecting clarified bulk (CB); and d) subjecting the clarified bulk to a purification process.

In certain embodiments of the invention, this disclosure provides a method of improving productivity of a therapeutic protein of interest, comprising: a) culturing host cells expressing the protein under optimized culture conditions in a bioreactor for at least 6 days; b) adding a carboxypeptidase (CP) to the cultured cells; c) collecting clarified bulk (CB); and d) subjecting the clarified bulk to a purification process.

Definitions

In order that the present disclosure may be more readily understood, certain terms are first defined. As used in this application, except as otherwise expressly provided herein, each of the following terms shall have the meaning set forth below. Additional definitions are set forth throughout the application.

The indefinite articles "a" or "an" should be understood to refer to "one or more" of any recited or enumerated component.

The term "about" as used herein to a value or composition that is within an acceptable error range for the particular value or composition as determined by one of ordinary skill in the art, which will depend in part on how the value or composition is measured or determined, i.e., the limitations of the measurement system. For example, "about" can mean a range of plus or minus 50% of a stated reference value, preferably a range of plus or minus 25%, or more preferably a range of plus or minus 10%. When particular values or compositions are provided in the application and claims, unless otherwise stated, the meaning of "about" should be assumed to be within an acceptable error range for that particular value or composition.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone). The use of the alternative (e.g., "or") should be understood to mean either one, both, or any combination thereof of the alternatives.

The term "protein" as used herein refers to a peptide-linked chain of amino acids regardless of length. One or more amino acid residues in the protein may contain a modification such as, but not limited to, glycosylation, phosphorylation or disulfide bond formation. The term "protein" is used interchangeably herein with "polypeptide."

The term "protein of interest" as used herein is used in its broadest sense to include any protein (either natural or recombinant), present in a mixture, for which purification is desired. Such proteins of interest include, without limitation, enzymes, hormones, growth factors, cytokines, immunoglobulins (e.g., antibodies), and/or any fusion proteins.

The term "therapeutic protein," as used herein, refers to any protein that is known to be useful for the prevention, treatment; or amelioration of a disease or disorder, e.g., an antibody, growth factor, cell surface receptor, cytokine, hormone, toxin, or fragments and/or fusion proteins of any of the foregoing.

The term "Fe-fusion protein", as used herein, is meant to encompass therapeutic proteins comprising an immunoglobulin-derived moiety (i.e., a Fe moiety) and a moiety derived from a second, non-immunoglobulin protein.

An "antibody" (Ab) shall include, without limitation, a glycoprotein immunoglobulin (Ig) which binds specifically to an antigen and comprises at least two heavy (H) chains and two light (L) chains interconnected by disulfide bonds, or an antigen-binding portion thereof.

An "isolated" or "purified" Ab as used herein refers to an Ab that is substantially free of other Abs having different antigenic specificities. Moreover, an isolated Ab may also mean an Ab that is purified so as to be substantially free of other cellular material and/or chemicals.

The term "monoclonal antibody" (mAb) as used herein refers to a non-naturally occurring preparation of Ab molecules of single molecular composition, i.e., Ab molecules Whose primary sequences are essentially identical and which exhibit a single binding specificity and affinity for a particular epitope. A mAb is an example of an isolated Ab.

MAbs may be produced by hybridoma, recombinant, transgenic or other techniques known to those skilled in the art.

The term "mAb of interest" as used herein refers to a mAb, present in a mixture, for which purification is desired.

A "chimeric" Ab as used herein refers to an Ab in which the variable regions are derived from one species and the constant regions are derived from another species, such as an Ab in which the variable regions are derived from a mouse Ab and the constant regions are derived from a human Ab.

A "human" mAb (HuMAb) as used herein refers to a mAb having variable regions in which both the framework and CDR regions are derived from human germline immunoglobulin sequences. Furthermore, if the Ab contains a constant region, the constant region also is derived from human germline immunoglobulin sequences. The human Abs of the invention may include amino acid residues not encoded by human germline immunoglobulin sequences (e.g., mutations introduced by random or site-specific mutagenesis in vitro or by somatic mutation in vivo). However, the term "human" Ab, as used herein, is not intended to include Abs in which CDR sequences derived from the germline of another mammalian species, such as a mouse, have been grafted onto human framework sequences. The terms "human" Abs and "fully human" Abs are used synonymously.

A "humanized" mAb as used herein refers to a mAb in which some, most or all of the amino acids outside the CDR domains of a non-human mAb are replaced with corresponding amino acids derived from human immunoglobulins. In one embodiment of a humanized form of an Ab, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the Ab to bind to a particular antigen. A "humanized" Ab retains an antigenic specificity similar to that of the original Ab.

An "anti-antigen" Ab as used herein refers to an Ab that binds specifically to an antigen. For example, an anti-PD-1 Ab is an Ab that binds specifically to PD-1.

The terms "culture", "cell culture", and "mammalian cell culture" as used herein refer to a mammalian cell population that is suspended in a medium under conditions suitable to survival and/or growth of the cell population. As will be clear to those of ordinary skill in the art, these terms as used herein may refer to the combination comprising the mammalian cell population and the medium in which the population is suspended.

The term "culturing" or "cell culturing" means the maintenance or growth of a mammalian cell in a liquid culture medium under a controlled set of physical conditions.

The terms "seeding", "seeded", "inoculation", "inoculating" and "inoculated" as used herein refer to the process of providing a cell culture to a bioreactor or another vessel. The cells may have been propagated previously in another bioreactor or vessel. Alternatively, the cells may have been frozen and thawed immediately prior to providing them to the bioreactor or vessel. The term refers to any number of cells, including a single cell.

The term "basal medium" as used herein refers to a solution containing nutrients which nourish growing mammalian cells. Typically, the solution provides essential and non-essential amino acids, vitamins, energy sources, lipids, and trace elements required by the cell for minimal growth and/or survival. The solution may also contain components that enhance growth and/or survival above the minimal rate, including hormones and growth factors. The solution is preferably formulated to a pH and salt concentration optimal for cell survival and proliferation. Various components may be added to a basal medium to benefit cell growth. The medium may also be a "chemically-defined medium" that does not contain serum, hydrolysates or components of unknown composition. Defined media are free of animal-derived components and all components have a known chemical structure.

The term "batch" or "batch culture" as used herein refers to a method of culturing cells in which all the components that will ultimately be used in culturing the cells, including the basal medium as well as the cells themselves, are provided at the beginning of the culturing process. A batch culture is typically stopped at some point and the cells and/or components in the medium are harvested and optionally purified.

The term "fed-batch" or "fed-batch culture" means the incremental or continuous addition of a feed medium to an initial cell culture without substantial or significant removal of the initial basal medium from the cell culture. In some instances, the feed medium is the same as the initial basal medium. In some instances, the feed medium is a concentrated form of the basal medium. In some instances, a feed medium may be different than the base medium but contain the desired nutritional supplements.

The term "perfusion" or "perfusion process" as used herein refers to a method of culturing cells in which equivalent volumes of media (containing nutritional supplements) are simultaneously added and removed from the bioreactor while the cells are retained in the reactor. A volume of cells and media corresponding to the supplement media is typically removed on a continuous or semi-continuous basis and is optionally purified. Typically, a cell culture process involving a perfusion process is referred to as "perfusion culture." A fresh medium may be identical, similar to, or different than the base medium used in the cell culture process.

The term "N-1 stage" as used herein refers to the last seed expansion stage right before production inoculation. The N-1 stage is the final cell growth step before seeding the production bioreactor for production of a protein of interest. The terms "N-2 stage" and "N-3 stage" as used herein refers to the period of time during cell growth and expansion and, typically, before inoculation of N production stage. The N-3 stage is the cell growth stage used to increase viable cell density to be used in the N-2 stage. The N-2 stage is the cell growth stage used to increase viable cell density to be used in the N-1 stage.

The term "production stage" or "N production stage" of the cell culture refers to last stage of cell culture. During the production stage, the cells are cultured with a primary focus of producing a protein of interest, for example a mAb. The production stage is commonly referred to as "N" or last stage of cell culture manufacturing.

The term "bioreactor" as used herein refers to any vessel used for the growth of a mammalian cell culture. The bioreactor can be of any size so long as it is useful for the culturing of mammalian cells. Typically, the bioreactor will be at least 1 liter and may be 2, 5, 10, 100, 250, 500, 1000, 2500, 5000, 8000, 10,000, 12,000, 15,000, 20,000 liters or more, or any volume in between. The internal conditions of the bioreactor, including, but not limited to pH and temperature, are typically controlled during the culturing period. The bioreactor can be composed of any material that is suitable for holding mammalian cell cultures suspended in media under the culture conditions of the present invention, including glass, plastic or metal.

The term "production bioreactor" as used herein refers to the final bioreactor used in the production stage of the cell culture for the production of a protein of interest (e.g. mAb). The volume of the large-scale cell culture production bioreactor is typically at least 500 liters and may be 1000, 2500, 5000, 8000, 10,000, 12,000, 15,000, 20,000 liters or more, or any volume in between. One of ordinary skill in the art will be aware of and will be able to choose suitable bioreactors for use in practicing the present invention.

The term "titer" as used herein refers to the total amount of recombinantly expressed a protein of interest, for example, a mAb produced by a mammalian cell culture, divided by a given amount of medium volume, Titer is typically expressed in units of grams of polypeptide or protein per liter of medium.

The term "harvest" refers to a procedure of removal of cells and cell debris to yield a clarified bulk (CB) suitable for protein purification. This is generally accomplished by any suitable technique, including but not limited to centrifugation, depth filtration and sterile filtration, depending on scale and facility capability.

As used herein, "clarified hulk" and "CB" are used interchangeably and refer to the solution collected after the primary recovery step, such as centrifugation, depth filtration, or flocculation, which is used to clarify the cell culture fluid.

The term "purification" refers to a procedure of at least partially purifying or isolating (e.g., at least or about 5%, e.g., at least or about 10%, 15%, 20%, 25%, 30%, 40%, 45%, 50%, 55%, 60%, 65%, 70%, 75%, 80%, 85%, 90%, or at least or about 95% pure by weight) a protein of interest from one or more other components present in the cell culture medium (e.g., mammalian cells or culture medium proteins) or one or more other components (e.g., DNA, RNA, or other proteins) present in a mammalian cell lysate. Typically, the degree of purity of the protein of interest is increased by removing (completely or partially) at least one impurity from the composition.

The term "carboxypeptidase" refers to a multifunctional enzyme that cleaves proteins from the C-terminus. There are many different types of carboxypeptidases including Carboxypeptidase A (CpA), Carboxypeptidase B (CpB), Carboxypeptidase D (CpD) Carboxypeptidase E (CpE), Carboxypeptidase M Carboxypeptidase N (CpN), Carboxypeptidase T (CpT), Carboxypeptidase Y (CpY), Carboxypeptidase M32, Glutamate carboxypeptidase (GCP) Prolyl arboxypeptidase (PCP), D-alanyl-D-alanine carboxypeptidase (AACP), Procarboxypeptidase and others.

In certain embodiments of the invention, this disclosure provides a method producing a therapeutic protein of interest, comprising: a) culturing host cells expressing the protein under optimized culture conditions in a bioreactor for at least 6 days; b) adding a carboxypeptidase to the cultured cells; c) harvesting and collecting clarified bulk (CB); and d) subjecting the clarified bulk to a purification process.

In certain embodiments of the invention, this disclosure provides a method of improving productivity of a therapeutic protein of interest, comprising: a) culturing host cells expressing the protein under optimized culture conditions in a bioreactor for at least 6 days; b) adding a carboxypeptidase to the cultured cells; c) harvesting and collecting clarified bulk (CB); and d) subjecting the clarified hulk to a purification process.

The term "carboxypeptidase B" refers to a carboxypeptidase that successively cleaves the basic amino acids such as arginine and lysine from the C-terminus of proteins.

In certain aspects of the invention, the carboxypeptidase is carboxypeptidase B (CpB).

In certain embodiments of the invention, this disclosure provides a method producing a therapeutic protein of interest, comprising: a) culturing host cells expressing the protein under optimized culture conditions in a bioreactor for at least 6 days; h) adding a carboxypeptidase B to the cultured cells; c) harvesting and collecting clarified bulk (CB); and d) subjecting the clarified bulk to a purification process.

In certain embodiments of the invention, this disclosure provides a method of improving productivity of a therapeutic protein of interest, comprising: a) culturing host cells expressing the protein under optimized culture conditions in a bioreactor for at least 6 days; b) adding a carboxypeptidase B to the cultured cells; c) harvesting and collecting clarified bulk (CB); and d) subjecting the clarified bulk to a purification process.

Various aspects of the disclosure are described in further detail in the following subsections.

In certain embodiments of the invention, this disclosure provides a method of improving productivity of a monoclonal antibody (mAb) of interest, comprising: a) culturing host cells expressing the mAb under optimized culture conditions in a bioreactor for at least 6 days; b) adding a carboxypeptidase (CP) to the cultured cells; c) collecting clarified bulk; and d) subjecting the clarified bulk to a purification process.

In certain aspects of the invention, the protein has a lysine or arginine in the C-terminus.

In certain aspects of the invention, the protein is a Fc-fusion protein or an antibody.

In certain aspects of the invention, the antibody is a mAb.

In certain aspects of the invention, the bioreactor is a production bioreactor.

In certain aspects of the invention, the carboxypeptidase is added to a batch, fed-batch or prefusion cell culture before harvest.

In certain aspects of the invention, the carboxypeptidase is selected from Carboxypeptidase A (CPA), Carboxypeptidase. B (CpB), Carboxypeptidase. D (CPD), Carboxypeptidase H (CPH), Carboxypeptidase F (CPE), Carboxypeptidase M (CPM), Carboxypeptidase N (CPN), Carboxypeptidase T (CPT), Carboxypeptidase Y (CPY), Carboxypeptidase M32, Glutamate carboxypeptidase (GCP), Prolyl arboxypeptidase (PCP), D-alanyl-D-alanine carboxypeptidase (AACP) or Procarboxypeptidase.

In certain aspects of the invention, the cells are cultured in a production bioreactor for about 14 days. In certain aspects of the invention, the cells are cultured in a production bioreactor for about 15 days. In certain aspects of the invention, the cells are cultured in a production bioreactor for about 16 days. In certain aspects of the invention, the cells are cultured in a production bioreactor for about 17 days. In certain aspects of the invention, the cells are cultured in a production bioreactor for about 18 days. In certain aspects of the invention, the cells are cultured in a production bioreactor for about 19 days. In certain aspects of the invention, the cells are cultured in a production bioreactor for about 20 days. In certain aspects of the invention, the cells are cultured in a production bioreactor for about 21 days. In certain aspects of the invention, the cells are cultured in a production bioreactor for about 22 days.

In certain aspects of the invention, the carboxypeptidase is added during the production stage of the cultured cells.

In certain aspects of the invention, the carboxypeptidase is added to the cultured cells between 0 to 24 hours before harvest.

In certain aspects of the invention, the carboxypeptidase is added to the cultured cells about 0.5 hour, about 1 hour, about 2 hours, about 3 hours, about 4 hours, about 5 hours, about 6 hours, about 7 hours, about 8 hours about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or 24 hours before harvest.

In certain aspects of the invention, the carboxypeptidase is added to the cultured cells about 2 hours before harvest.

In certain aspects of the invention, the carboxypeptidase Bis added to the cultured cells about 2 hours before harvest.

In certain aspects of the invention, the carboxypeptidase is added to the culture cells at harvest.

In certain aspects of the invention, the cells are in a perfusion, a batch or a fed batch cell culture.

In certain aspects of the invention, the carboxypeptidase is added in an amount sufficient to reduce basic species of the protein of interest.

In certain aspects of the invention, the carboxypeptidase is added at a ratio between 0.001% to 1% w/w of CP:protein of interest. In certain aspects of the invention, the carboxypeptidase is added at a ratio about 0.001%, about 0.002%, about 0.005%, about 0.01%, about 0.02%, about 0.05%, about 0.1%, about 0.2%, about 0.5%, or about 1% w/w of CP:protein of interest.

In certain aspects of the invention, the carboxypeptidase is added in an amount sufficient to reduce basic species of the mAb of interest.

In certain aspects of the invention, the carboxypeptidase B is added at a ratio between 0.001% to 1% w/w of CP:mAb of interest.

In certain aspects of the invention, the carboxypeptidase. B is added at a ratio about 0.001%, about 0.002%, about 0.005%, about 0.01%, about 0.02%, about 0.05%, about 0.1%, about 0.2%, about 0.5%, or about 1% w/w of CP:mAb of interest.

In certain aspects of the invention, the carboxypeptidase B is added at a about 0.01%, w/w of CP:mAb of interest.

In certain aspects of the invention, carboxypeptidase is added more than once to the production bioreactor.

In certain aspects of the invention, the host are CHO cells.

In certain aspects of the invention, the antibody binds an antigen selected from the group consisting of PD-1, PD-L1, CTLA-4, LAG-3, TIGIT, GITR, CXCR4, CD73 HER2, VEGF, CD20, CD40, CD11a, tissue factor (TF), PSCA, IL-8, IL-13, SARS-CoV-2 spike protein, EGFR, HER3, and HER4.

In certain aspects, the mAb is Nivolumab.

mAb Charge Variants

Monoclonal antibodies (mAbs) are heterogeneous in their biochemical and biophysical properties due to multiple post-translational modification and degradation events. Charge heterogeneity of mAbs can be affected by these modification resulting in alteration of the net charge or the local charge distribution. Charge variants of mAbs are identified as acidic species, basic species and main species. The term "main species", "main peak" or "main variant" of mAb as used herein refers to the mAb that is eluted as the major peak with neutral Isoelectric Point (0), The term "acidic species" or "acidic variant" of mAbs used herein refers to the variants with lower pI than the main species. The term "basic species" or "basic variant" of mAb as used herein refers to the variants with higher pI than the main species. C-terminal Lysine residues of the mAb can result in additional positive charges and increasing the basic species of the mAb. The non-efficient cleavage of C-terminal lysine residues by endogenous carboxypeptidases during the antibody production is one of the major reasons to result in a mAb with zero, one or two C-terminal lysine (Zhang et al., 2015).

Charge variants can be separated using charged based-separation techniques such as isoelectric focusing (IEF) gel electrophoresis, capillary isoelectric focusing (cIEF) gel electrophoresis, cation exchange chromatography (CEX) and anion exchange chromatography (AEX). Herein charge variant species are analyzed by Imaged Capillary Isoelectric Focusing (iCIEF), using a Protein Simple iCE3 instrument with an Alcott 720NV autosampler. Samples were mixed with appropriate pI markers, ampholytes, and urea, then injected into a fluorocarbon coated capillary cartridge. High voltage was applied and under the voltage a pH gradient is created within the column. The charged variants migrated to their respective pI. A UV camera captured the image at 280 nM, The main peak was identified and the peaks that migrated into the acidic and basic ranges were summed, quantitated, and reported as relative percent areas.

Several ways of charge variant profile control include use of cell culture media with lower copper concentration (Kim et al., 2016), adjustment of Lysine concentrations in the media, temperature shift (Kim et al., 2016), extending culture duration, construction of mAb with C-terminal deletions of Lysine (Luo et al., 2012; Jiang et al., 2016). These strategies occur during or prior to the cell culture phase thus impact multi-pathways altogether, and will lead to unpredictable overall cell culture performance, titer performance, or product qualities. U.S. Pat. No. 5,672,347 disclosed a method to add a carboxypeptidase to the clarified bulk, which involved in extra process and incubation time.

In contrast, the methods of this invention utilized a carboxypeptidase near the end of the cell culture production stage so as to avoid these uncertainties of affecting cell culture. Without any other changes in original run setting, there is no need for additional steps to get rid of the introduced new entity as the added carboxypeptidase will go through the normal downstream purification process and be removed. This greatly simplifies the overall procedure.

The charge variant profile is mAb-dependent, and some mAbs (e.g. mAb-1) have a higher percentage of basic species and a lower percentage of main species when they are secreted from host cells during the cell culture. For example, the percentage of the mAb-1 basic species is more than 8% after culturing for 10 days in a production bioreactor. The percentage of mAb basic variants will keep increasing as the production time gets longer. Thus a longer production time with a higher titer but a lower percentage of mAb basic variants might be impossible for these mAbs. In the current invention, the cell culture duration can be extended from 10 days to 14 days in a production bioreactor for these mAbs with the issue of a high percentage of basic variants. The methods can be applied to other biologics that have similar charge variant profile issues.

In this invention, Applicants developed simple, robust, and cost-effective CpB treatment methods for the quality and productivity improvement of intensified cell culture processes for mAb-1 production using an industrial CHO cell line. The intensified processes, e.g., Process B intensified by non-perfusion N-1, Process C intensified by perfusion N-1, and Process D intensified by perfusion in production stage, achieved much higher productivities than the conventional ted-batch manufacturing Process A. However, the intensified fed-batch Process B and C had to harvest much earlier and the perfusion Process D could not be implemented due to a lower main peak, which failed to meet the release specification. The lower main peak was mainly due to higher basic species caused by higher C-terminal lysine variants for the intensified processes. After the CpB treatment, the C-terminal lysine was effectively removed, which resulted in significantly decreased basic species and increased main peak levels for all intensified processes with the release specification met for the entire culture durations. Within a longer cell culture production window after the CpB treatment, fed-batch Process B and C achieved much higher final titers. In addition, the clearance of CpB during downstream processing was demonstrated with similar downstream step yields and in-process quality attribute profiles regardless of CpB treated or not.

In certain aspects of the invention, the carboxypeptidase is added to the cultured cells in an amount sufficient to reduce basic species of the mAb of interest.

In certain aspects of the invention, the carboxypeptidase is added to the cultured cells in an amount sufficient to increase the main species of the mAb of interest, Host Cells Any mammalian cell or cell type susceptible to cell culture, and to expression of proteins, may be utilized in accordance with the present invention. Non-limiting examples of mammalian cells that may be used in accordance with the present invention include BALB/c mouse myeloma line (NSO/1, ECACC No: 85110503); human retinoblasts (PER.C6 (CruCell, Leiden, The Netherlands)); monkey kidney CV1 line transformed by SV40 (COS-7, ATCC CRL 1651); human embryonic kidney line (293 or 293 cells subcloned for growth in suspension culture, Graham et al., J. Gen Virol., 36:59 (1977)); baby hamster kidney cells (BHK, ATCC CCL 10); Chinese hamster ovary cells ±DHFR (CHO, Urlaub and Chasin, Proc. Natl. Acad. Sci. USA, 77:4216 (1980)); mouse sertoli cells (TM4, Mather, Biol. Reprod., 23:243-251 (1980)); monkey kidney cells (CV1 ATCC CCL 70); African green monkey kidney cells (VERO-76, ATCC CRL-1 587); human cervical carcinoma cells (HeLa, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562; ATCC CCL5 1); TRI cells (Mather et al., Annals N.Y. Acad. Sci., 383:44-68 (1982)); MRC 5 cells; FS4 cells; and a human hepatoma line (Hep G2). In one embodiment of the present invention, the host cell is a CHO cell line.

Providing a Mammalian Cell Culture

Once a cell that expresses the protein of interest has been identified, the cell is propagated in culture by any of the variety of methods well-known to one of ordinary skill in the art. The cell expressing the protein of interest is typically propagated by growing it at a temperature and in a medium that is conducive to the survival, growth and viability of the cell. The initial culture volume can be of any size, but is often smaller than the culture volume of the production bioreactor used in the final production of the protein of interest, and frequently cells are passaged several times in bioreactors of increasing volume prior to seeding the production bioreactor. Once the cells have reached a specific viable cell density, the cells are grown in a bioreactor to further increase the number of viable cells. These bioreactors are referred to as N-1, N-2, N-3, and etc, "N" refers to the main production culture bioreactor, while the "N-1" means the bioreactor prior to the main production culture, and so forth.

Generally, cell cultures of N-1 may be grown to a desired density before seeding the next production bioreactor. It is preferred that most of the cells remain alive prior to seeding, although total or near total viability is not required.

Production of Expressed Protein

During the production stage, the cells are cultured with a primary focus of producing a protein of interest, for example a mAb of interest. The production stage is commonly referred to as "N" or last stage of cell culture manufacturing. Generally, a production bioreactor is applied for the final bioreactor used in the production stage of the cell culture for the production of a protein of interest (e.g. mAb). The volume of the large-scale cell culture production bioreactor is typically at least 500 liters and may be 1000, 2500, 5000, 8000, 10,000, 12,000, 15,000, 20,000 liters or more, or any volume in between. One of ordinary skill in the art will be aware of and will be able to choose suitable bioreactors for use in practicing the present invention.

In certain aspects of the invention, the cell culture is a perfusion, a batch or a fed batch cell culture in certain preferred aspects, the cell culture in the production bioreactor is a fed batch cell culture.

Extending cell culture production duration by cell line engineering, medium development and bioreactor optimization has been one of the major strategies for titer improvement of fed-batch processes over the last decades (Druz, Son, Betenbaugh, Shiloach, 2013; Fan et al., 2015; Powers et al., 2019; Wurm, 2004). Regardless of cell culture production duration, one production batch requires similar cell growth time to peak VCD, turnaround time between batches, and similar costs for the batch setup including seed expansion, medium preparation, and bioreactor operation (Chen, et al., 2018; Xu, et al., 2020). Thus, increasing titer by extending cell culture production window in the stationary phase can increase manufacturing productivity and reduce manufacturing costs (Wurm, 2004; Xu et al., 2012; Xu, et al., 2020). Nevertheless, fed-batch cell cultures with durations of 2 weeks or more will eventually enter the death phase with increased toxic metabolites, decreased VCD, and lower cell viability, which may result in poor product quality (Arden Betenbaugh, 2004; Henry of al., 2020). In some cases, in order to meet the quality requirements and release specifications, fed-batch cell cultures may require to be harvested earlier during the middle of the stationary phase.

Figure 1B:
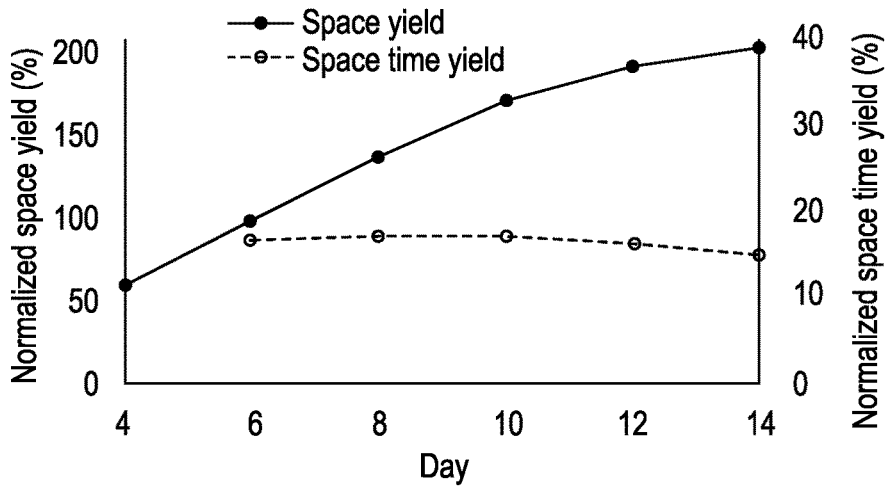
Figure 1C:
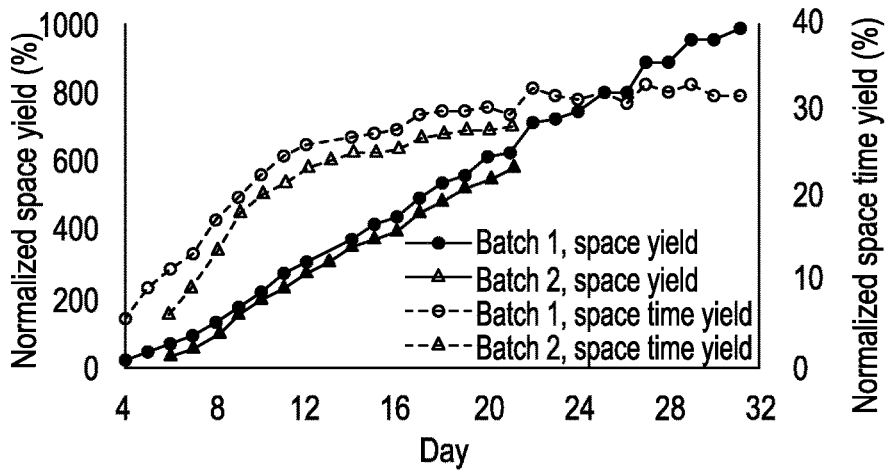

Such was the case here where the intensified Process B and C had to be terminated early because of the main peak failed to meet the specification on day 14 (FIGS. 1A-C). However, after the CpB treatment, the main peak met the specification during the entire duration for all intensified processes (FIGS. 1A-C). Process B was extended from day 10 to day 14 with a space yield improved by 38% and 22% reduction of the upstream consumable cost per g of final drug substance by the CpB treatment. Similarly, Process C was extended from day 6 to day 14 with a space yield improved by 108% and about 46% reduction of the upstream consumable cost (FIGS. 1A-C and Table 2). In comparison to the conventional Process A, the space time yields were substantially improved for Processes B, C, and D by factors of 3.7, 5.4, and 11, respectively by addition of this CpB treatment step and the process intensification strategies described previously (FIGS. 1A-C).

Other mitigation strategies that affect C-terminal lysine levels, e.g., cell line engineering and cell culture medium and process optimization, were reported in literature. Hu et al. (Hu et al., 2017) reported that the CHO cells with C-terminal lysine deletion DNA sequence indeed produced less C-terminal lysine-related basic variants, but resulted in a lower titer and higher total basic species due to a more prevalent proline amidation than the wild type CHO cells. Furthermore it was found that the C-terminal lysine and glycine deletion CHO cells produced lower basic species and comparable titers to the wide type CHO cells. Nevertheless, the safety of lysine and glycine deletion mAbs are still to be tested in patients prior to use for commercial manufacturing (Hu et al., 2017). In addition, after knocking out the carboxypeptidase D gene, CHO cells produced 100% C-terminal lysine at the end of the mAb heavy chains (Hu et al., 2016). Although this provides another solution to eliminating C-terminal lysine heterogeneity, it is opposite from our purpose to decrease C-terminal lysine to a minimum, thus producing a more homogenous product where changing the cell line was not an option. In general, changing cell lines may take a long time due to times needed for cell line generation, lead clone screening and new process development. Most importantly, depending on the phase of development, change in cell line is a major process change requiring stringent regulatory review. Therefore, a cell line change may be more challenging to implement than employing the enzyme treatment developed here.

Modulating C-terminal lysine has also been approached using cell culture media. It has been reported that lower copper and higher zinc concentrations (Luo et al., 2012; Yuk et al., 2015) and adjusting lysine concentrations in media (Zhang et al., 2015) may be used to lower C-term levels. For process control strategies, it has been well studied that a temperature shift to lower degrees can increase main peak levels in cell culture (Kishishita et al., 2015; McHugh, Xu, Aron, Borys, & Li, 2020). However, such media and temperature shift strategies, as expected, will be cell line and process dependent.

In certain embodiments of the invention; the cells are allowed to grow for a defined period of time to produce the protein of interest in a bioreactor. For example, depending on the starting concentration of the cell culture, the temperature at which the cells are grown, and the intrinsic growth rate of the cells, the cells may be grown for 5, 6, 7, 8, 9, 10, 11, 12, 13, 14, 15, 16, 17, 18, 19, 20 or more days in a bioreactor. The practitioner of the present invention will be able to choose the duration of growth depending on the polypeptide production requirements and the needs of the cells themselves. In certain aspects of the invention, a carboxypeptidase is added after the cells have been grown for at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, or at least 22 days in a production bioreactor.

At the end of production bioreactor run, cell culture broth is taken out and harvested with removal of cells and cell debris to yield a clarified bulk suitable for protein purification. This is generally accomplished by any suitable technique, including but not limited to centrifugation, depth filtration and sterile filtration, depending on scale and facility capability.

In certain aspects of the invention, carboxypeptidase is added to any point of the production stage of the cell culture. In some aspects of the invention, carboxypeptidase is added to the cells growing in the production bioreactor 0, 2, 4, 6, 8, 10, 12, 14, 16, 18, 20, 22, 24 hours or more, or any time in between before or during the harvest. In certain preferred aspects of the invention, the carboxypeptidase is added about 2 hours before the harvest.

In certain aspects of the invention, after adding the carboxypeptidase to the production bioreactor, the culture temperature is kept the same as used in the previous culture condition, or the temperature is shifted. One of ordinary skill in the art will be aware of and will be able to choose suitable temperatures for use in practicing the present invention.

In certain aspects of the invention, after adding the carboxypeptidase to the production bioreactor, the culture pH is kept the same as used in the previous culture conditions, or the pH is shifted. In certain aspects, the pH is above 7.0 after adding the carboxypeptidase. One of ordinary skill in the art will be aware of and will be able to choose suitable pHs for use in practicing the present invention.

The CpB treatment developed in the invention provides a simple, robust, flexible, and cost effective method for efficient C-terminal lysine removal and is expected to have minimum impact on cell culture manufacturing. Due to the nature of the underlying mechanism, this enzyme treatment strategy could be applicable to other processes that have similar quality issues.

Purification of Expressed Protein

In general, it will typically be desirable to isolate and/or purify the protein of interest (e.g. mAb) from the clarified bulk. Generally, the clarified bulk will go through a series purification steps, including but not limited to affinity chromatography (e.g. Protein A chromatography), virus inactivation & depth filtration, hydrophobic interactive chromatography, ion exchange chromatography, viral filtration, concentration and diafiltration.

In certain aspects of the invention, the carboxypeptidase is added during any of these purification processes.

In certain embodiments of the invention, this disclosure provides a method of improving productivity of a therapeutic protein of interest, comprising: a) culturing host cells expressing the protein under optimized culture conditions in a bioreactor for at least 6 days; b) collecting clarified bulk; c) subjecting the clarified bulk to a purification process; and d) adding a carboxypeptidase to the purification process.

In certain embodiments of the invention, this disclosure provides a method of producing a therapeutic protein of interest, comprising: a) culturing host cells expressing the protein under optimized culture conditions in a bioreactor for at least 6 days; b) collecting clarified bulk; c) subjecting the clarified bulk to a purification process; and d) adding a carboxypeptidase to the purification process.

Recombinant Antibody

The methods of the present invention can be used for large-scale production of any antibody. Antibodies within the scope of the present invention include, but are not limited to: anti-HER2 antibodies including Trastuzumab (HERCEPTIN®) (Carter et al., *Proc. Natl. Acad. Sci. USA*, 89:4285-4289 (1992); anti-HER3 antibodies; anti-HEIN antibodies; U.S. Pat. No. 5,725,856); anti-CD20 antibodies such as chimeric anti-CD20 "C2B8" as in U.S. Pat. No. 5,736,137 (RITUXAN®), a chimeric or humanized variant of the 2H7 antibody as in U.S. Pat. No. 5,721,108B1, or Tositumomab (BEXXAR®); anti-IL-8 (St John et al., *Chest*, 103:932 (1993), and international Publication No. WO 95/23865); anti-VEGF antibodies including humanized and/or affinity matured anti-VEGF antibodies such as the humanized anti-VEGF antibody huA4.6.1 AVASTIN® (Kim et al., *Growth Factors*, 7:53-64 (1992), International Publication No. WO 96/30046, and WO 98/45331, published Oct. 15, 1998); anti-PSCA antibodies (WO01/40309); anti-CD40 antibodies, including S2C6 and humanized variants thereof (WO00/75348); anti-CD11a (U.S. Pat. No. 5,622,700, WO 98/23761, Steppe et al., *Transplant Intl* 4:3-7 (1991), and Hourmant et al., *Transplantation* 58:377-380 (1994)); anti-IgE (Presta et al., *J. immunol.* 151:2623-2632 (1993), and International Publication No. WO 95/19181); anti-CD18 (U.S. Pat. No. 5,622,700, issued Apr. 22, 1997, or as in WO 97/26912, published Jul. 31, 1997); anti-IgE (including E25, E26 and E27; U.S. Pat. No. 5,714,338, issued Feb. 3, 1998 or U.S. Pat. No. 5,091,313, issued Feb. 25, 1992, WO 93/04173 published Mar. 4, 1993, or International Application No. PCT/US98/13410 filed Jun. 30, 1998, U.S. Pat. No. 5,714,338); anti-Apo-2 receptor antibody (WO 98/51793 published Nov. 19, 1998); anti-TNF-α antibodies including cA2 (REMICADE®), CDP571 and MAK-195 (See, U.S. Pat. No. 5,672,347 issued Sep. 30, 1997. Lorenz et al., *J. Immunol.* 156(4):1646-1653 (1996), and Dhainaut et al., *Crit. Care Med.* 23(9):1461-1469 (1995)); anti-Tissue Factor (TF) (European Patent No. 0 420 937 B1 granted Nov. 9, 1994); anti-human $α_4β_7$ integrin (WO 98/06248 published Feb. 19, 1998); anti-EGFR (chimerized or humanized 225 antibody as in WO 96/40210 published Dec. 19, 1996); anti-CD3 antibodies such as OKT3 (U.S. Pat. No. 4,515,893 issued May 7, 1985); anti-CD25 or anti-tac antibodies such as CHI-621 (SIMULECT®) and (ZENAPAX®) (See U.S. Pat. No. 5,693,762 issued Dec. 2, 1997); anti-CD4 antibodies such as the cM-7412 antibody (Choy et al., *Arthritis Rheum* 39(1):52-56 (1996)); anti-CD52 antibodies such as CAMPATH-1H (Riechmann et al., *Nature* 332:323-337 (1988)); anti-Fc receptor antibodies such as the M22 antibody directed against FcγRI as in Graziano et al., *J. Immunol.* 155(101:4996-5002 (1995); anti-carcinoembryonic antigen (CEA) antibodies such as hMN-14 (Sharkey et al., *Cancer Res.* 55(23 Suppl): 5935s-5945s (1995); antibodies directed against breast epithelial cells including huBrE-3, hu-Mc 3 and CRL6 (Ceriani et al., *Cancer Res.* 55(23): 5852s-5856s (1995); and Richman et al., *Cancer Res.* 55(23 Supp): 5916s-5920s (1995)); antibodies that bind to colon carcinoma cells such as C242 (Litton et al., *Eur J. Immunol.* 26(1):1-9 (1996)); anti-CD38 antibodies, e.g. AT 13/5 (Ellis et al., *J. Immunol.* 155(2):925-937 (1995)); anti-CD33 antibodies such as Hu M195 (Jurcic et al., *Cancer Res* 55(23 Suppl): 5908s-5910s (1995) and CMA-676 or CDP771; anti-CD22 antibodies such as LL2 or LymphoCide (Juweid et al., *Cancer Res* 55(23 Suppl): 5899s-5907s (1995)); anti-EpCAM antibodies such as 17-1A (PANOREX®); anti-GpIIb/IIIa antibodies such as abciximab or c7E3 Fab (REOPRO®); anti-RSV antibodies such as MEDI-493 (SYNAGIS®); anti-CMV antibodies such as PROTOVIR®; anti-HIV antibodies such as PRO542; anti-hepatitis antibodies such as the anti-Hep B antibody OSTAVIR®; anti-CA 125 antibody OvaRex; anti-idiotypic GD3 epitope antibody BEC2; anti-αvβ3 antibody VITAXIN®; anti-human renal cell carcinoma antibody such as ch-G250; ING-1; anti-human 17-1A antibody (3622W94); anti-human colorectal tumor antibody (A33); anti-human melanoma antibody R24 directed against GD3 ganglioside; anti-human squamous-cell carcinoma (SF-25); anti-human leukocyte antigen (HLA) antibodies such as Smart ID10; anti-PD-1 antibodies; anti-PD-L1 antibodies; anti-LAG-3 antibodies; anti-GITR antibodies; anti-TIGIT antibodies; anti-CXCR4 antibodies; anti-CD73 antibodies; anti-IL-13 antibodies, anti-SARS-CoV-2 spike protein antibodies and the anti-HLA DR antibody Oncolym (Lynn-1)).

In certain aspects of the invention, the mAb is Nivolumab.

In certain aspects of the invention, the disclosure provides a method of reducing heterogeneity of a monoclonal antibody (mAb) of interest in a cell culture, comprising: a) culturing host cells expressing the mAb under optimized culture conditions in a production bioreactor for at least 6 days, wherein the percentage of the mAb basic species is higher than 8% of the total mAb; b) adding a carboxypeptidase to the cultured cell; c) collecting clarified bulk; and e) subjecting to a purification process.

In certain aspects of the invention, the disclosure provides a method of reducing heterogeneity of a monoclonal antibody (mAb) of interest in a cell culture, comprising: a) culturing host cells expressing the mAb under optimized culture conditions in a production bioreactor for at least 10 days, wherein the percentage of the mAh basic species is higher than 10% of the total mAb; b) adding a carboxypeptidase to the cell culture; c) collecting clarified bulk; and e) subjecting to a purification process.

In certain aspects of the invention, the carboxypeptidase is added to the production bioreactor at a ratio of CP:mAb sufficient to reduce mAb basic species, wherein the percentage of mAh basic species is dropped to 10%, 9%, 8%, 7%, 6%, 5%, 4%, 3%, 2%, 1%, 0.1% or less of the total mAb in CP treated clarified bulk.

In certain aspects of the invention, the carboxypeptidase is added to the production bioreactor at a ratio of CP:mAb sufficient to reduce mAb basic species, wherein the percentage of mAb basic species is dropped to less than 8% of the total mAb in CP treated clarified bulk.

In certain preferred aspects of the invention, the percentage of mAb basic species is dropped to less than 5% of the total mAb in CP treated clarified bulk.

The foregoing description is to be understood as being representative only and is not intended to be limiting. Alternative methods and materials for implementing the invention and also additional applications will be apparent to one of skill in the art and are intended to be included within the accompanying claims.

Example 1

Materials and Methods

Cell Line, Media and Upstream Cell Culture Processes for mAb-1

Four different cell culture processes, Process A, B, C and D, were used for mAb-1 (IgG4) production in this study. A recombinant CHO cell line, which has the endovenous glutamine synthetase (GS) gene and was engineered by using GS as selectable marker, was used for Process A with proprietary serum free media. There was a change to a new CHO cell line with the endogenous GS knockout ($GS^{-/-}$) used with different proprietary chemically defined media for Processes B, C and D.

Process A was a conventional 14-day fed-batch process with an inoculation cell density of $0.3\times10^6$ cells/mL, which was used for commercial manufacturing at 5000-L and 15,000-L, bioreactor scales with a temperature shift from 36.5 to 34° C. on day 5. Process B, an intensified fed-batch process with enriched N-1 seed culture (Yongky et al., 2019), was developed with a target inoculation cell density of $3\times10^6$ cells/mL in 5-L bioreactors (Sartorius, Germany) starting with a 3 L initial working volume and a temperature shift from 36.5 to 34° C. on day 6 of the 14-day process. Process C, an intensified fed-batch process with perfusion N-1 seed culture (J Xu, Rehmann, Xu, et al., 2020), was developed with a target inoculation cell density of $15\times10^6$ cells/mL in 5-L bioreactors (Sartorius, Germany) starting with a 3 L initial working volume and a temperature shift from 36.5 to 34° C. on day 4 of the 14-day process, Process D was a perfusion production process with a target inoculation cell density of $10\times10^6$ cells/mL in 3-L bioreactors (Applikon, USA) starting with a 1-L working volume and at 36.5° C. for the entire duration. The media exchange using an ATF1 system (Repligen, USA) was started from day 0 and slowly ramped up to 2-4 volume of media per bioreactor volume per day (VVD) until the target VCD of $50\times10^6$ cells/mL was achieved. Batch 1 of Process D reached the target VCD on day 5. Then the media exchange for the batch 1 used a "Push-to-Low" strategy (Konstantinov et al., 2006) with 4 VVD from day 5-11, 3 VVD from day 11-18, 2 VVD from day 18-25 and 1 VVD from day 26-31. Batch 2 of Process D reached the target VCD on day 6 and then the media exchange changed to 2 VVD and maintained for the duration of the 21-day run.

Upstream Cell Culture titer, Productivity and Other In-Process Assays for mAb-1

The product concentration or titer (g/L) was measured using Protein A UPLC. In order to compare the productivities between fed-batch and perfusion mode, space time yield or overall volumetric productivity (g/L/day) and space yield (g/L) are used in this study. Space time yield is defined as total mAb-1 produced per L culture volume over the culture duration from day 0 to the day when the mAb-1 concentration is measured (Bausch et al. 2019). Space yield, a new cell culture term presented in this study, is defined as total mAb-1 produced per liter culture volume. The space yield for a fed-batch process is equal to the bioreactor titer, while the space yield for a perfusion process is much higher than the bioreactor titer, because the cell culture broth including product is removed out of and fresh media is continuously fed into the bioreactor. The normalized space yield or titer (normalized weight/L) was further normalized relative to the day-10 average titer for Process B as 100%. The normalized space time yield (normalized weight/L/day) was equal to the normalized space yield (relative to the day 10 average titer for Process B) divided by the culture duration.

Other in-process cell culture assays were performed as follows. Off-line pH, $pCO_2$ and $pO_2$ were detected using a Bioprofile pHOx analyzer (Nova Biomedical, USA). VCD and cell viability were measured off-line using a Vi-CELL XR automatic cell counter (Beckman Coulter, USA). Glucose, glutamine, glutamate, lactate, and ammonia were measured using a CEDEX Bio HT analyzer (Roche, USA).

CpB Treatment Methods

The CpB treatment protocol for complete cleavage of C-terminal lysine residues was as follows: the CpB enzyme concentration was 1% (w/w) ratio of CpB:mAb in a pH 7.6 Tris buffer containing 25 mM Tris-HCl and 100 mM NaCl and incubated overnight at 37° C. The method was adapted for different matrixes including whole cell culture or supernatant. The CpB treatment protocol for mAb-1 used much lower concentration of CpB at 0.01% (w/w), at 34° C. for 2 hours, which also achieved the complete C-terminal lysine cleavage. There was no pH adjustment of the whole cell culture or supernatant, since pH values for mAb-1 whole cell cultures and supernatants were in the optimal range of pH 7.5-8.0. Supernatant was obtained from bioreactor samples centrifuged at 1000 g for 10 min. The supernatant used in the CpB treatment was either freshly prepared or thawed from a frozen sample stored at −80° C. The methods for different pH and temperature studies are described in the Results section.

Three different CpB products from different sources were used in this study: recombinant CpB made from *E. coli* (ProSpec-Tany TechnoGene Ltd., Israel), GMP grade recombinant CpB made from *P. pastoris* (Roche, USA), and porcine CpB extracted from porcine pancreas (Sigma-Aldrich Corporation, USA).

Downstream Processing and CpB Clearance Study

In order to generate cell culture material for downstream processing and to evaluate CpB clearance, two 5-L bioreactors of Process B were used, as described in the Results section. At harvest on day 14, one 5-L whole cell culture prior to harvest was treated with 0.05% (w/w) CpB at 34° C.

for 2 hours, while the other 5-L bioreactor was maintained at 34° C. for 2 hours without CpB treatment as a control. Both treated and untreated 5-L whole cell cultures were then processed through identical downstream steps. After centrifugation at 1000 g for 30 min, the supernatants were filtered with 0.2 μm sterile filtration. The clarified bulks were then processed through the downstream steps comprised of: purification by Protein A affinity chromatography, low pH virus inactivation and depth filtration, hydrophobic interactive chromatography (HIC), cation exchange chromatography (CEX), concentration by ultrafiltration and diafiltration (UF/DF) to generate final formulated DS.

Product Quality Attributes

Assessing quality attributes of whole cell culture and supernatant samples required purification by Protein A chromatography prior to submission for quality attribute assays. Downstream in-process samples after the Protein A step (Protein A elute, HIC and CEX pools etc), were directly submitted for quality attribute assays.

Charge variant species (main, acidic and basic peaks), were assayed by imaged capillary isoelectric focusing (iCIEF), using a Protein Simple iCE3 instrument with an Alcott 720NV autosampler (San Jose, CA). Samples were mixed with appropriate pI markers, ampholytes, and urea, then injected into a fluorocarbon coated capillary cartridge. High voltage was applied and the charged variants migrated according to their respective pI. A UV camera captured the image at 280 nM. The main peak was identified and the peaks that migrated into the acidic and basic ranges were summed, quantitated, and reported as relative percent areas. The mAb-1 specification for main peak was normalized to 100%. If normalized main peak levels are ≥100%, the mAb-1 drug substances meet the specification. If normalized main peak levels are <100%, the mAb-1 drug substances fail that specification. All main peak and basic species levels were normalized to the main peak value using the DS specification as 100% in this study. Acidic species levels were not reported, because acidic species levels were well within the specification regardless of the CpB treatment for all the processes.

N-Glycan analysis was performed using Glyco Works RapiFluor-MS kit from Waters (Milford, MA). The free oligosaccharides were profiled using an Acquity UPLC Glycan BEH Amide, 130 Å, 1.7 μm, 2.1×10 mm column (Milford, MA) with gradient elution on a Waters Acquity H-Class system (Milford, MA) equipped with a temperature-controlled autosampler and fluorescence detector.

Size exclusion chromatography (SEC) for impurity was performed using a Waters Acquity BEH200, 4.6 mm×30 mm, 1.7 μm coupled with Waters Acquity guard column, with an isocratic gradient monitored at 280 nm on a Waters Acquity UPLC system (Milford, MA) equipped with a temperature-controlled autosampler and Waters 2996 PDA detector.

Samples were prepared under both reduced and non-reduced conditions for protein purity by CE-SDS. Samples were then injected onto the PA800 instrument with a UV detector (AB Sciex, Framingham, MA, USA) and 50 μm internal diameter pre-cut capillaries using the 32 Karat software. The separation occurred by applying a constant 15 kV. Data were exported and analyzed using Empower 3 software from Waters (Milford, MA, USA).

HCP was quantified using a process specific sandwich enzyme-linked immunosorbent assay (ELISA). Samples were loaded onto a coated assay plate from VWR (Radnor, PA, USA), and the absorbance was measured using Magellan Infinite M1000 Pro plate reader from Tecan Inc. (Morrisville, NC, USA). Concentration is back calculated using 4-parameter logistic curve fitting algorithm.

Residual host cell DNA was assayed by qPCR using forward and reverse primer from Integrated DNA Technologies (Skokie, IL, USA), TaqMan and extraction kit from Applied Biosystems (Foster Cite, CA, USA). Samples were analyzed using 7900 real time PCR system from Applied Biosystems (Foster City, CA, USA) and data was processed using Standard curve.

Residual protein A was assayed using a commercially available ELISA kit from Repligen (Waltham, MA, USA), and absorbance is measured using Magellan Infinite M1000 Pro plate reader from Tecan Inc. (Morrisville, NC, USA). Concentration is back calculated using 4-parameter logistic curve fitting algorithm.

The residual CpB was measured throughout the purification steps by ELISA. The anti-CpB antibody was generated in-house, while the horseradish peroxidase conjugated secondary antibody was purchased from Thermo Fisher Scientific Inc., USA.

Upstream Cost Analysis

Upstream consumable costs were calculated as dollar per gram of final formulated DS, as described in detail in our previous publication (J. Xu, Xu, et al., 2020). All upstream costs were normalized to the cost for Process B harvested on day 10 as 100% in this study. In brief, the upstream consumable cost focused on media, filters, probes and bags, while downstream processing (including harvest) costs were not included. The assumption was that the intensified lab processes described in this study could be scaled up at 2000-L disposable bioreactor scale with the same titers or space yields and the same ratio of raw material consumption as 5-L bioreactors. For the day 14 Process B and Process C, the additional CpB cost at 0.01% (w/w) was assumed, since the CpB treatment was required to increase main peak to meet the DS release specification. In order to calculate the upstream cost per gram DS, the overall downstream yield was assumed to be 70% based on lab-scale performance.

Results

Improvement of mAh-1 Productivity and Quality (Main Peak) of Intensified Processes by CpB Treatment In order to improve mAh-1 productivity from the conventional manufacturing Process A, three intensified processes were developed in this report. As described in the Methods section, the space yield (a new term, defined as total gram of protein produced per liter bioreactor culture in this study) and space time yield were used for the productivity comparison of different fed-batch and perfusion processes. The space yield is equal to the bioreactor titer for a fed-batch process, but is much higher than the bioreactor titer for a continuous process due to the product removal out of bioreactor by perfusion. Process A with a target inoculation cell density of $0.3 \times 10^6$ cells/mL achieved a normalized space yield (or titer) of 37.0±2.4% (normalized weight/L), and a normalized space time yield (or overall volumetric productivity) of 2.6±0.2% (normalized weight/L/day) day 14 (n=29). The fed-batch Process B with a target inoculation cell density of $3 \times 10^6$ cells/mL was intensified by using enriched media at the N-1 seed with a normalized space yield of 138±5% (normalized weight/L) and normalized space time yield of 9.9±0.9% (normalized weight/1/day) (n=4) on day 14 (FIG. 1A), while the fed-hatch Process C with a target inoculation cell density of $15 \times 10^6$ cells/mL was intensified by perfusion for the N-1 seed cultures resulted in a normalized space yield of 198±2% (normalized weight/L)

(n=4) and a normalized space time yield of 14.1±0.2% (normalized weight/L/day) (n=4) on day 14 (FIG. 1B). Perfusion Process D was intensified by perfusion at the production step. Batch 1 of Process D with variable medium exchange rates by a "Push-to-Low" strategy, as described in the Methods section, achieved a normalized space yield of 994% (normalized weight/L) on day 31 (FIG. 1C). Batch 1 of Process D achieved a normalized space time yield of 30% (normalized weight/L/day) on day 17 and then the normalized space time yield for the batch 1 was maintained between 30-33% (normalized weight/L/day) from day 17 to day 31 (FIG. 1C), Batch 2 of Process D with a fixed medium exchange rate of 2 VVD achieved a normalized space yield of 599% (normalized weight/L) on day 21 (FIG. 1C). Batch 2 of Process D achieved a normalized space time yield of 28% (normalized weight/L/day) on day 18 and then the normalized space time yield for batch 2 was maintained between 28-29% (normalized weight/L/day) from day 18 to day 21 (FIG. 1C).

Figure 2A:
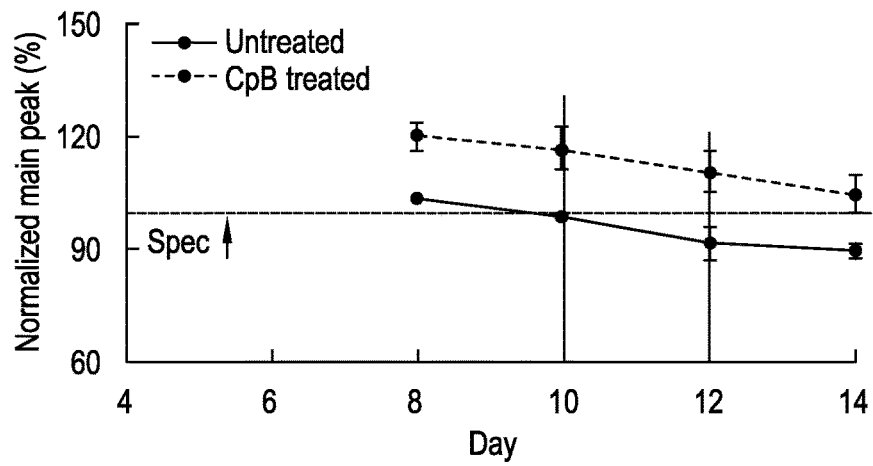
FIG. 2A, FIG. 2B and FIG. 2C show normalized main peak levels (normalized to the release specification (Spec) for main peak as 100%) with CpB treated (dashed lines) and untreated control (solid lines) for mAb-1 in lab bioreactors (the same as in FIGS. 1A-C)
Figure 2B:
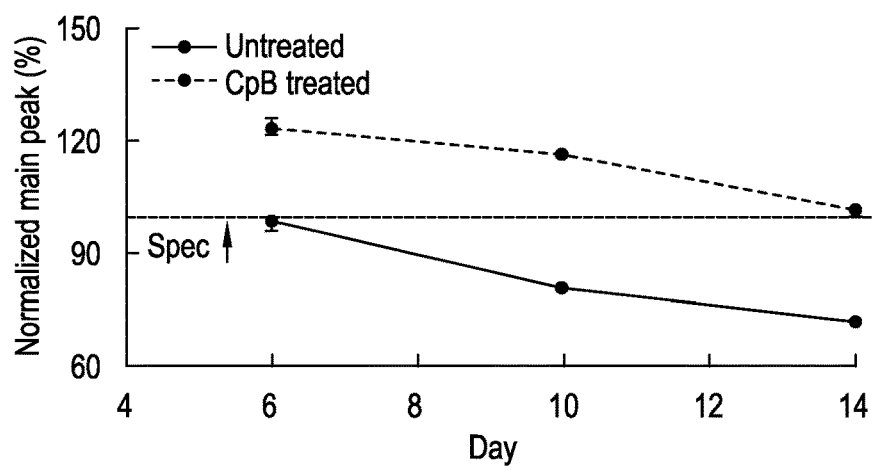
Figure 2C:
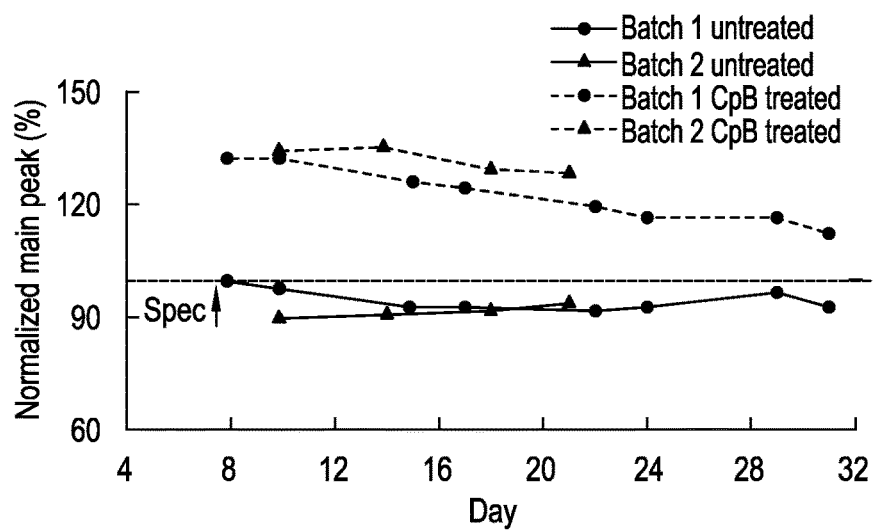

As described above, both space yields and space time yields of intensified processes were significantly increased from Process B to C and D, all of which were substantially improved compared to Process A. However, the levels of main peak significantly decreased with the increase of the culture duration for both fed-batch Process B (FIGS. 2A and C (FIG. 2B). The DS specification limit for main peak of this particular mAb-1 is 100% (normalized value), which was established based on Process A in commercial manufacturing. Although improving cell culture productivity is a great benefit, protein quality attributes have to meet the release specification. Therefore, it was necessary to harvest on day 10 for Process B (FIG. 1A) and day 6 for Process C (FIG. 1B), even though the space yield continued to increase for the entire 14-day duration. Although the perfusion Process D achieved the highest space yield and space time yield among all processes, Process D could not be implemented in manufacturing because the main peak levels for Process D were below the specified limit throughout the entire culture duration (FIG. 2C). It should be noted that charge variant profiles were not changed during downstream processing. Other quality attributes, e.g., SEC impurities and N-glyans, were not a concern for the intensified Process B, C and D regardless of cell culture durations in this study (data not shown).

Figure 3A:
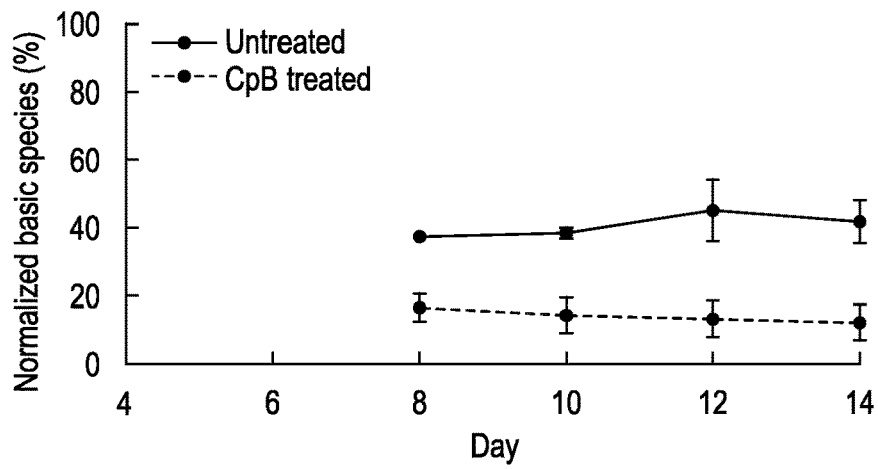
FIG. 3A, FIG. 3B and FIG. 3C show normalized basic species levels (normalized to the release specification for main peak as 100%) with CpB treated (dashed lines) and untreated control (solid lines) for mAb-1 in lab bioreactors (the same as in FIGS. A-C)
Figure 3B:
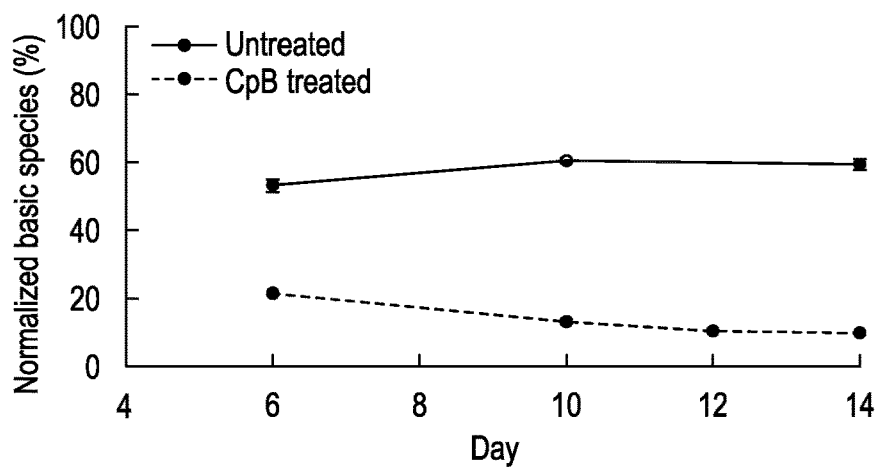
Figure 3C:
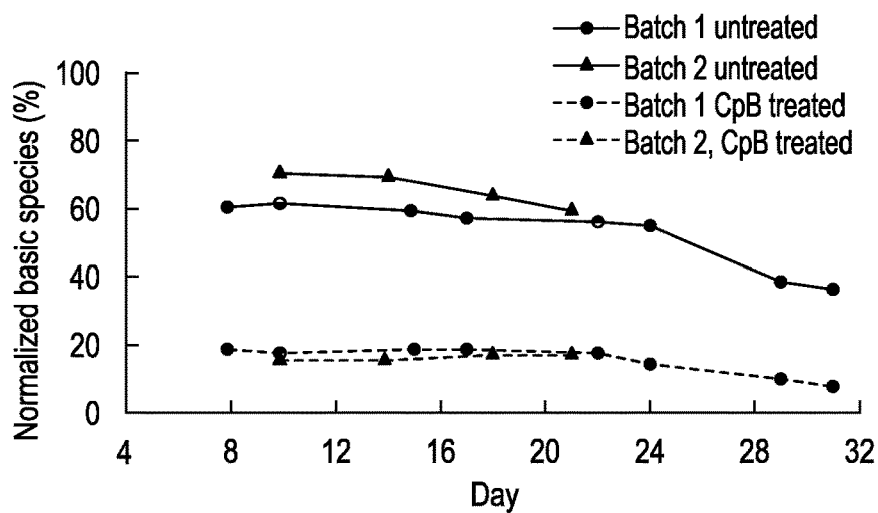
Figure 4:
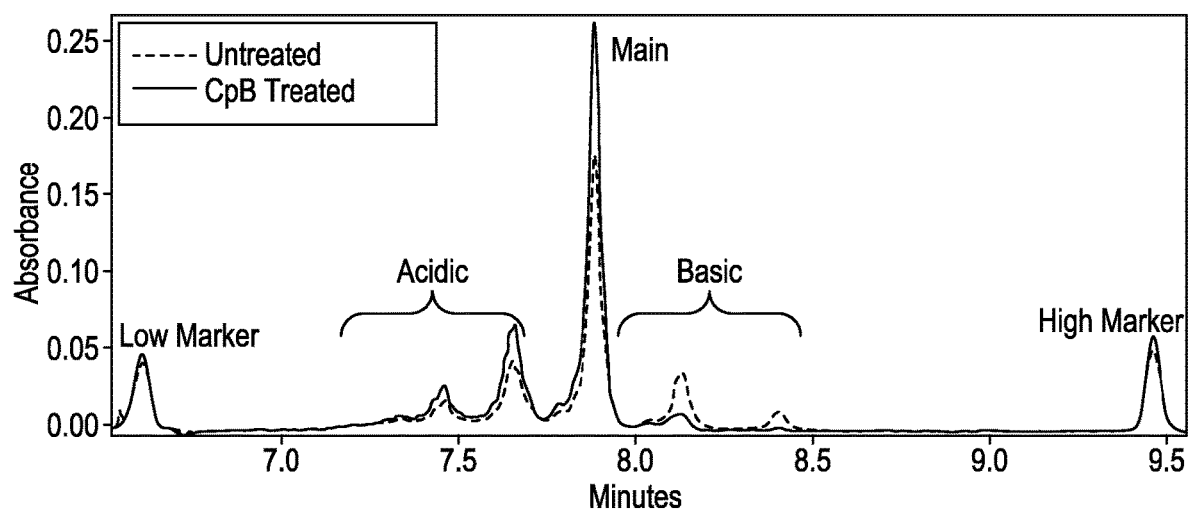
FIG. 4 shows iCE chromatogram comparison of mAb-1 with CpB treated (solid line) and untreated control (dashed line). Main peak and bask species levels were normalized to the mAb-1 release specification for main peak as 100%.

The normalized basic species levels ranging from 25-65% for the intensified processes (FIG. 3) were much higher than Process A ranging from 5-18% (n=164), As shown in FIG. 4 as an example of the intensified processes, the basic species was mainly due to C-terminal lysine, as demonstrated by the substantially reduced value after the standard CpB treatment assay. After the CpB treatment, most of basic species were convened to main peak, which increased from 91.8 to 107.7%. Although 91.8% of main peak failed to meet the specification (i.e, ≥100% for main peak), 107.7% main peak after the CpB treatment was satisfactory (FIG. 4). It should be noted that the acidic species levels for all samples made from Process B, C and D met the specification regardless of the CpB treatment (data not shown). Therefore, the change of acidic species after CpB treatment was not a concern and only main peak and basic species were reported in this study.

CpB treatment was performed for all in-process samples generated from Processes B, C and D at multiple time points to evaluate its impact on main peak levels. As presented in FIG. 2, after the CpB treatment (dashed lines), the main peak levels substantially increased with decreased basic species (FIG. 3) for all the intensified processes. The normalized main peak levels at different time points were above 100% for all the intensified processes for the entire duration tested (FIG. 2). Therefore, the cell culture duration could be extended from day 10 to day 14 for Process B with an average of 38% increase in final harvest titer (compared to day-10 titer, FIG. 1A), and from day 6 to day 14 for Process C with an average of 108% increase in final harvest titer (compared to day-6 titer, FIG. 1B). For Process D, the CpB treatment (FIGS. 2C and 3C) had the most significant impact and allowed this process to be a potential viable option for manufacturing.

CpB Treatment Optimization for mAb-1

Figure 5:
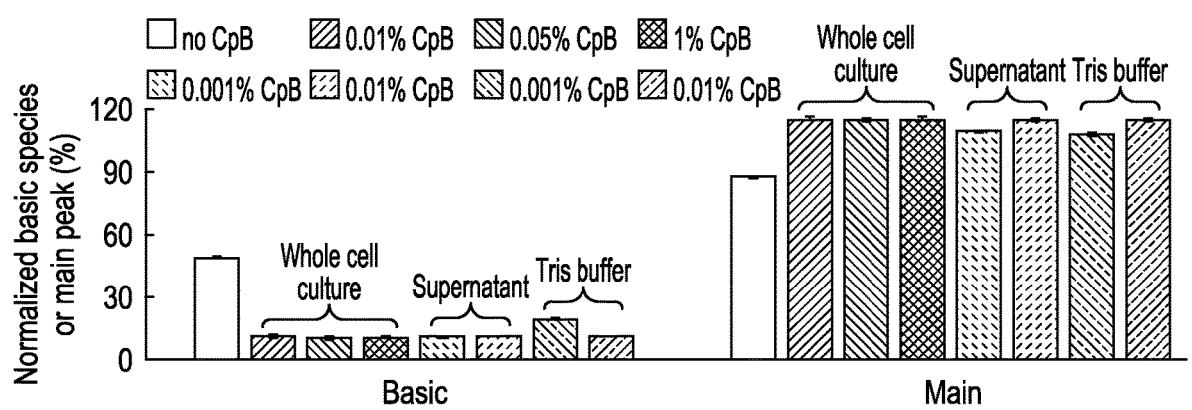
FIG. 5 shows mAb-1 normalized main peak and basic species levels after the CpB treatment with different enzyme concentrations at 34° C. in different matrices for 2 hours: whole cell culture with 1%, 0.05%, 0.01% (w/w) concentrations; cell culture supernatant with 0.01% and 0.001% (w/w) concentrations, and 5 mg/mL mAb-1 in Tris buffer at pH 7.6 with 0.01% and 0.001% (w/w) concentrations, respectively, using a CpB untreated sample as control (n=3).

After a preliminary lab study (data not shown), 2-hour duration of the CpB treatment was chosen, because the 2-hour reaction time was sufficient for removing C-terminal lysine and easy for implementation in biomanufacturing operations. Based on the initial 1% (w/w) of enzyme:mAb ratio, the CpB treatment method was further optimized. First, the enzyme concentrations in different matrixes were evaluated for CpB treatment efficiency. In the whole cell culture broth, the standard CpB treatment method (e.g., 1% (w/w) enzyme concentration) converted most of basic species to main peak as expected (FIG. 5). It was observed that the CpB concentrations can be reduced by 100 fold at 0.01% (w/w) while achieving the same efficiency as the standard treatment at 1% (w/w) CpB (FIG. 5). In addition, the 0.01% (w/w) CpB concentration also worked well in cell culture supernatant and Tris buffer (FIG. 5). Nevertheless, as shown in FIG. 5, when the CpB concentration reduced to 0.001% (w/w), the main peak levels were significantly lower than those treated with 0.01% (w/w) in both cell culture supernatant (t-test, p<0.0001) and Tris buffer (t-test, p<0.01). To ensure effective clipping of C-terminal lysine, the 0.01% (w/w) concentration was chosen to move forward for all following studies.

Figure 6:
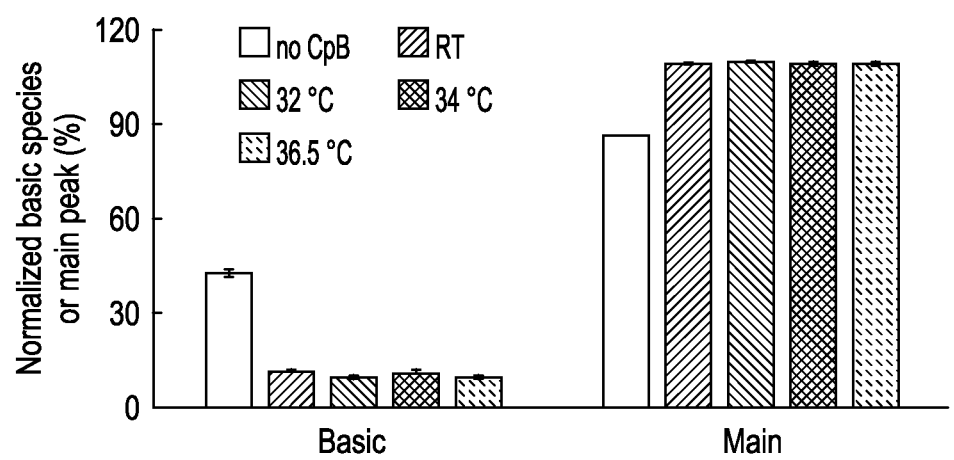
FIG. 6 shows mAb-1 normalized main peak and basic species levels after the CpB treatment at different temperatures (e.g., room temperature (RI), 32° C., 34° C., and 36.5° C.) in the cell culture supernatant, generated from Process B, with 0.01% (w/w) CpB concentration for 2 hours, using a CpB untreated sample as control (n=3).

Second, the temperature for CpB treatment was studied. The fed-batch cell culture was started at 36.5° C., and shifted to a lower temperature of 34° C., while harvest and downstream purification steps were performed at room temperature. Therefore, different temperatures ranging from room temperature, 32, 34 and 36.5° C. were studied using 0.01% (w/w) CpB for a 2-hour duration (FIG. 6). Similar high CpB treatment efficiency was observed between room temperature and 36.5° C. (FIG. 6).

Figure 7:
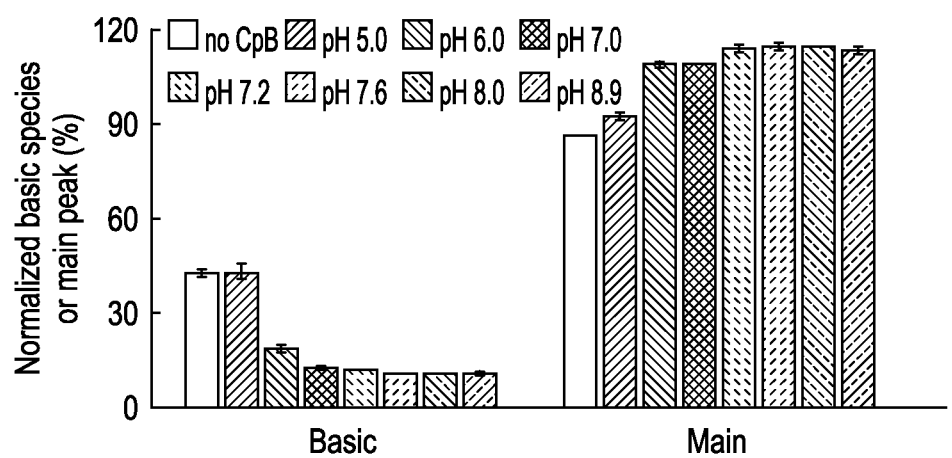
FIG. 7 shows mAb-1 normalized main peak and basic species levels after the CpB treatment at different pH values, e.g., pH 5.0 (25 mM Sodium Acetate, 12 mM Acetic Acid); pH 6.1 (25 mM Sodium Acetate, 12 mM Acetic Acid); pH 7.0 (25 mM Tris-HCl, 100 mM NaCl), pH 8.0 (25 mM Tris-HCl, 100 mM NaCl); pH 8.9 (25 mM Tris-HCl. 100 mM NaCl) spiked with purified mAb-1 at 34° C. with 0.01% (w/w) CpB concentration for 2 hours, using a CpB untreated sample as control (n=3).

Third, the impact of pH was studied. Fed-batch cultures can be operated from pH 6.5-8.0, while downstream steps are normally operated within a much wider pH range. Therefore, the effect of pH ranging between pH 5 and 9 was assessed with 0.01% (w/w) CpB at 34° C. for a 2-hour duration. The 34° C. temperature was chosen because the final CpB treatment step was preferably performed at the end of cell culture process for ease of operation, which will be described in detail later in this study. Similar high efficiency for the conversion of the basic species to the main peak was observed from pH 7.2 to 8.9, while about 4% lower efficiency was observed at pH 6.0-7.0 (FIG. 7). Much lower efficiency was observed at pH 5.0 (FIG. 7).

Figure 8:
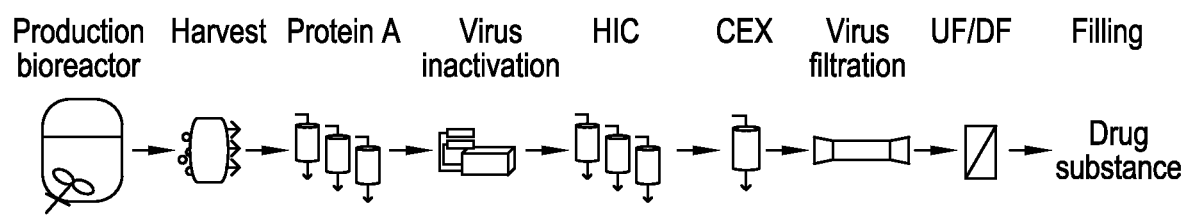
FIG. 8 shows a mAb-1 manufacturing process flowchart.

In summary, CpB treatment appeared effective within wide ranges of pH and temperature in different matrixes, including whole cell culture, cell culture supernatant (or clarified bulk at harvest) and Tris buffer (FIGS. 5-7). CpB treatment was found to be effective in other buffers, such as citrate, phosphate as well (data not shown). Theoretically, the results suggest that the CpB treatment could be introduced to one of many steps of the biomanufacturing process, from bioreactor operation, harvest and different downstream purification steps (FIG. 8). It was decided to introduce the 2-hour CpB treatment at the end of the cell culture portion of the fed-batch processes. The main reasons are as follows. The bioreactor is chilled from 34° C. to room temperature prior to initiating harvest by filtration, this takes >2 hours in commercial biomanufacturing. This temperature range from 34° C. to room temperature and the time for cooling is ideal for effective CpB treatment (FIG. 6). Although a sterile operation is required for cell culture, during the short duration of the cooling down phase, the sterile operation was not required for the CpB addition to the production bioreactor. This makes the CpB treatment easier with minimum impact on existing manufacturing processes. The pH of the whole cell culture was between pH 7.5-8.0, which was optimal for the treatment (FIG. 7). The introduction of CpB at the completion of the production bioreactor step allowed its effective removal during the harvest and downstream purification steps as the CpB (a new raw material) clearance in final drug substance needs to be fully demonstrated. For perfusion Process D, the CpB treatment could be introduced to the surge vessel at room temperature for 2 hours before 0.2 µm sterile filtration and Protein A purification step.

Demonstration of the CpB-Implemented Process at 5-L Scale

Figure 9:
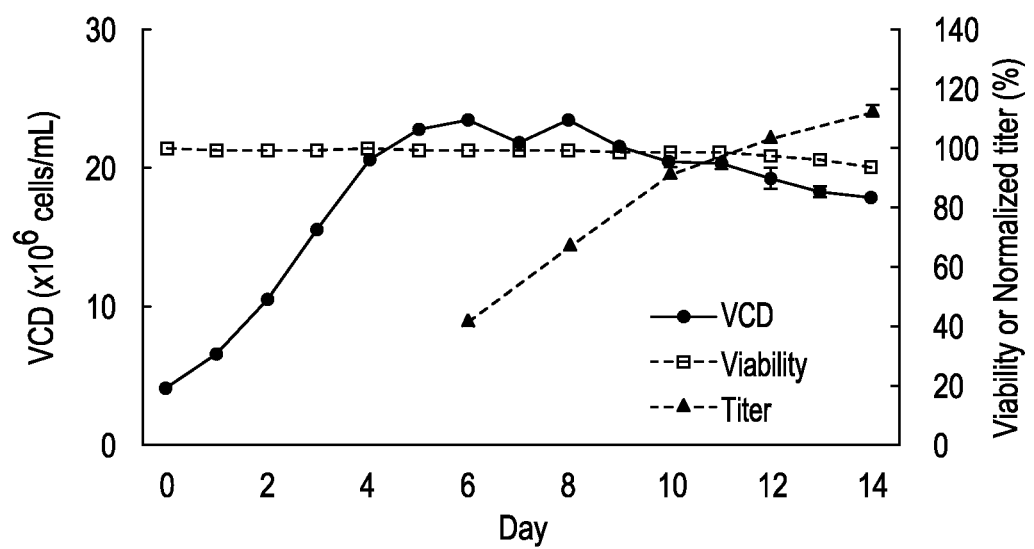
FIG. 9 shows mph-1 cell culture performance profiles (e.g., VCD, viability and normalized titer) in 5-L bioreactors with Process B (n=2), which was used for the subsequent CpB treatment with 0.05% (w/w) concentration at 34° C. for 2 hours and then was run through the entire downstream processing for both the CpB treated and untreated conditions (Table 1).

Since the clearance of all raw materials used in biomanufacturing must be demonstrated in the final DS (FDA, 2016; J. Xu, Rehmann, Tian, et al., 2020), two 5-L fed-batch bioreactors were performed using Process B as an example. Subsequent harvest and downstream steps were performed, one with CpB-treatment one without. To ensure robust removal of CpB in the final DS, a 5-fold higher CpB level at 0.05% (w/titin) was used. The cell culture performance parameters, e.g., VCD, cell viability and normalized titer were similar to those in the untreated control Process B (FIG. 9). The Protein A step alone showed more than a 2-log reduction of CpB. CpB was below detection limit (<50 µg/L) in Protein A eluate and remained undetectable for the rest of the downstream steps (Table 1). For charge variant profiles, the main peak levels for CpB treated samples were higher than those untreated samples, and maintained similar levels for each arm through the downstream steps (Table 1). All other quality attributes, e.g., process related impurities and product related impurities, were comparable between these two conditions while achieving similar step and overall downstream yields (Table 1).

CpB Treatment Cost Analysis for mAb-1

Due to prolonged cell culture duration with the implementation of CpB treatment, the average final titer was improved by 38% for Process B and 108% for Process C, respectively (FIG. 1 and Table 2), Although 0.01% (w/w) CpB addition slightly increased the total consumable cost per upstream batch by 5% for Process B and 6% for Process C, the upstream consumable cost per gram DS reduced by 22% and 46% for Process B and C, respectively, due to significantly improved titers achieved by extending culture duration to 14 days (Table 2).

TABLE 1

CpB clearance, in-process quality attributes, and yields through the entire downstream processing between the untreated control and treated condition with 0.05% (w/w) CpB using the cell culture broth generated from the 5-L bioreactor run described in FIG. 7. Main peak and basic species levels were normalized to the release specification for the mAb-1 main peak as 100%.

| Downstream steps | Harvest | | Protein A | | Virus inactivation | | HIC | | CEX | | Drug substance | |
|---|---|---|---|---|---|---|---|---|---|---|---|---|
| CpB treatment | No | Yes | No | Yes | No | Yes | No | Yes | No | Yes | No | Yes |
| Residual CpB (µg/L) | NA | 5000 | NA | <50 | NA | <50 | NA | <50 | NA | <50 | NA | <50 |
| Normalized basic species (%) | 35% | 9% | 35% | 9% | 34% | 8% | 34% | 8% | 33% | 8% | 33% | 8% |
| Normalized main peak (%) | 92% | 108% | 92% | 108% | 93% | 109% | 94% | 110% | 95% | 111% | 95% | 111% |
| Host cell protein (ppm) | $8.11 \times 10^5$ | $8.82 \times 10^5$ | 418.3 | 419.8 | 77.4 | 106.3 | 13.3 | 14.1 | <1.4 | <2.7 | <3.8 | 2.1 |
| Residual Protein A (ppm) | NA | | 9 | 12.3 | 8.9 | 11.7 | 3 | <0.2 | <0.1 | 2.9 | 1.7 | 2.3 |
| Residual DNA (ppb) | | | <48 | <47 | <65 | <63 | <83 | <78 | NA | | <0.5 | <0.5 |
| SEC monomer (%) | | | 98.5 | 98.5 | 98.4 | 98.1 | 99.2 | 99 | 99.6 | 99.3 | 99.5 | 99.2 |
| SEC HMW (%) | | | 0.9 | 0.9 | 0.9 | 1.1 | 0.4 | 0.5 | 0.3 | 0.4 | 0.3 | 0.4 |
| SEC LMW (%) | | | 0.6 | 0.7 | 0.7 | 0.8 | 0.5 | 0.5 | 0.2 | 0.3 | 0.1 | 0.4 |
| CE-SDS (R), purity (%) | | | NA | | | | NA | | | | 99.5 | 99.5 |
| CE-SDS (NR), purity (%) | | | | | | | | | | | 98.2 | 97.9 |
| N glycan: G0 (%) | | | 1.6 | 1.6 | | | | | | | 1.7 | 1.7 |
| N glycan: G0F (%) | | | 65.6 | 65.6 | | | | | | | 66.2 | 66.1 |
| N glycan: G1F (%) | | | 25 | 24.9 | | | | | | | 24.7 | 24.7 |
| N glycan: G2F (%) | | | 3.3 | 3.3 | | | | | | | 3.1 | 3.2 |
| N glycan: Man5 (%) | | | 0.9 | 0.9 | | | | | | | 0.7 | 0.8 |
| Step yield (%) | | | 91 | 94 | 100 | 100 | 93 | 96 | 95 | 95 | NA | |
| Overall Yield (%) | | | No CpB treatment: 80; CpB treatment: 86 | | | | | | | | | |

NA: not available, since those samples were not tested.

TABLE 2

Cost of goods analysis of the CpB treatment for mAb-1 production using intensified fed-batch Process B and C. The upstream consumable cost (normalized value per gram of drug substance) was calculated based on the assumptions at 1000-L scale with the same titers at 5-L scale reported in FIG. 1 and 70% overall downstream yield. Both titer and upstream consumable cost per gram of formulated drug substance were normalized to the day 10 harvest condition for Process B as 100%.

| Intensified<br>fed-batch | Process B | | Process C | |
| --- | --- | --- | --- | --- |
| | Normalized<br>titer | Normalized<br>upstream cost | Normalized<br>titer | Normalized<br>upstream cost |
| D 6 (without CpB) | NA | NA | 95% | 128% |
| D 10 (without CpB) | 100% | 100% | NA | NA |
| D 14 (with 0.01% CpB) | 138% | 78% | 198% | 70% |
| Titer improvement or cost reduction by CpB | 38% | 22% | 108% | 46% |

NA: not applicable.

Potential Application of CpB Treatment for Other mAb Products

In addition to mAb-1, 6 other mAb products were tested with the standard CpB treatment method using a 1% (w/w) CpB concentration. There was a substantial decrease in the basic species and increase in the main peak for mAb-2, mAb-3 and mAb-4 upon CpB treatment (Table 3). For mAb-5, the effect to the basic species and main peak was also evident, but to a lesser extent. However, no change was observed for mAb-6 and mAb-7 (Table 3). The difference in the CpB effectiveness on basic species reduction was due to different amounts of C-terminal lysine present in the cell cultures for these mAbs. CpB treatment could only convert the basic species attributed to C-terminal lysine, but not those due to other molecular modifications such as, N-terminal pyro-glutamate, amidation etc. These results indicate that the COB treatment strategy for improving protein homogeneity by increasing the main peak may be applicable to those mAb products containing C-terminal lysine species.

TABLE 3

Normalized main peak and basic species levels for the untreated drug substances or CpB treated with 1% (w/w) enzyme concentration for different mAb products. Main peak and basic species levels were normalized to the mAb-1 release specification for main peak as 100%

| Charge<br>variant<br>species (%) | CpB | | | |
| --- | --- | --- | --- | --- |
| | Untreated | | Treated | |
| | Main | Basic | Main | Basic |
| mAb-2 (n = 2) | 89.3 ± 2.3 | 43.0 ± 4.1 | 113.6 ± 6.3 | 10.7 ± 1.6 |
| mAb-3 (n = 3) | 94.8 ± 11.6 | 51.4 ± 4.8 | 125.5 ± 15.7 | 9.8 ± 0.5 |
| mAb-4 (n = 3) | 85.0 ± 8.2 | 45.9 ± 1.43 | 102.7 ± 12.0 | 15.7 ± 7.1 |
| mAb-5 (n = 3) | 81.1 ± 3.2 | 22.7 ± 1.3 | 87.0 ± 3.4 | 14.3 ± 2.0 |
| mAb-6 (n = 2) | 99.5 ± 1.3 | 10.7 ± 0.4 | 99.6 ± 1.4 | 10.7 ± 0.4 |
| mAb-7 (n = 3) | 89.5 ± 1.3 | 40.2 ± 0.0 | 92.1 ± 1.3 | 38.4 ± 1.3 |

Example 2

Materials and Methods

Cell Line, Media and Cell Culture Processes

Figure 10:
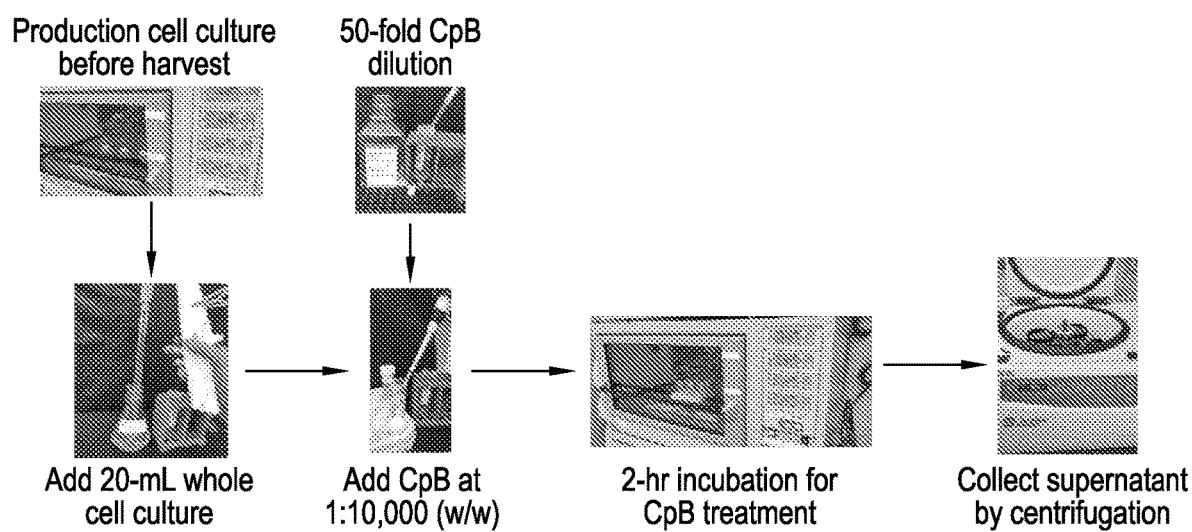
FIG. 10 show schematic diagram of in vitro CpB treatment protocol.

A CHO GS cell line was used for the expression of a proprietary human mAb-8, while a CHO DG44 cell line was used for the expression of a proprietary human mAb-3. Proprietary chemically defined seed, basal, and feed media were used. Vial thaw and seed expansion steps were performed using shake flasks (Corning Life Sciences) containing a seed medium with methionine sulfoximine as a selection agent for the CHO GS cell line and another seed medium with methotrexate as a selection agent for the CHO DG44 cell line. Cells were passaged every 3-4 days for at least 2 weeks prior to the inoculation of production cultures. Fed-batch production cell culture runs were performed using 250-mL shake flasks (n=3) containing an initial volume of 80 mL basal media and seed culture with a target inoculation viable cell density (VCD) of $1.5 \times 10^6$ cells/mL Proprietary feed media and 300 g/L glucose solution were used to maintain a good nutrient supply for the fed-batch production cultures, which were harvested on day 12. All seed cultures and production cultures were cultivated in a humidified incubator (Climo-Shaker, Kuhner) for the first five days using standard conditions of 36.5° C., 5% $CO_2$ and 150 rpm. Then, the temperature was shifted to 34° C. on day 5 until harvest on day 12 for all production cell cultures, In-vitro CpB Treatment Protocol Prior to use in this experiment, GMP grade recombinant CpB at 2.6 mg/mL made from *P. pastoris* (Roche) was kept frozen at −20° C. The in-vitro CpB treatment protocol for cleavage of C-terminal lysine residues is shown in FIG. 10. One mL of frozen CpB aliquot was thawed and diluted 50-fold in Dulbecco's phosphate-buffered saline (Gibco) right before use. At the end of the fed-batch production, 20 mL of the whole cell cultures were aliquoted from each shake flask into two 50-mL Falcon tubes. One set of Falcon tubes (n=3) were kept as CpB-free controls. The 50-fold diluted CpB was then added to the other set of Falcon tubes (n=3) at a. CpB:mAb ratio of 1:10,000 (w/w). Subsequently, all the Falcon tubes were returned to the humidified incubator under the same production cell culture conditions (150 rpm, 34° C. and 5% $CO_2$). After a 2-hour incubation, the cultures were centrifuged at 1000×g for 10 minutes and the supernatants were recovered and stored at 2-8° C. before quality attribute assays.

In-process Cell Culture and Quality Attribute Assays

Cell culture broth was sampled from each shake flask and directly analyzed for cell count, nutrients, and metabolites. VCD and cell viability were quantified off-line using a Vi-CELL XR automatic cell counter (Beckman Coulter). Glucose, lactate, and ammonia were quantified using a CEDEX Rio analyzer (Roche).

For titer measurements, the cell culture broth was centrifuged at 1000×g for 10 minutes, and the supernatant was analyzed using a Protein A UPLC method. The normalized titer, expressed as normalized weight/L, was equal to the true titer (g/L) at each time point divided by the average of day-10 titer (g/L) for mAb-1, as described in our previous report (Xu et al. 2021b). The normalized volumetric productivity, expressed as normalized weight/L/day, was calculated as the difference in normalized titers divided by the duration between two time points.

For quality attribute assays, all supernatants with and without CpB treatment at −80° C. were thawed and purified by Protein A chromatography first. Quality attribute assays were performed as previously described (Yongky et al, 2019). Charge variant species acidic, main and basic) were measured by imaged capillary isoelectric focusing. Both main peak and basic species for mAb-8 and mAb-3 were normalized to the mAb-1 specification for main peak as 100%, as described in our previous report (Xu et al, 2021b). N-glycan profiles (e.g. G0, G0F, G1F, G2F and Man5) were measured using a commercially available RapiFluor-MS N-Glycan kit from Waters. SEC was used to measure SEC impurities (e.g., high molecular weight (HMW), low molecular weight (LMW) and monomer).

Statistical Analysis

Unless otherwise noted, data presented in the figures are sample means with standard deviations. Student's t-test analysis was performed using Microsoft Excel with the significance level set at p value <0.05.

Results

Figure 11A:
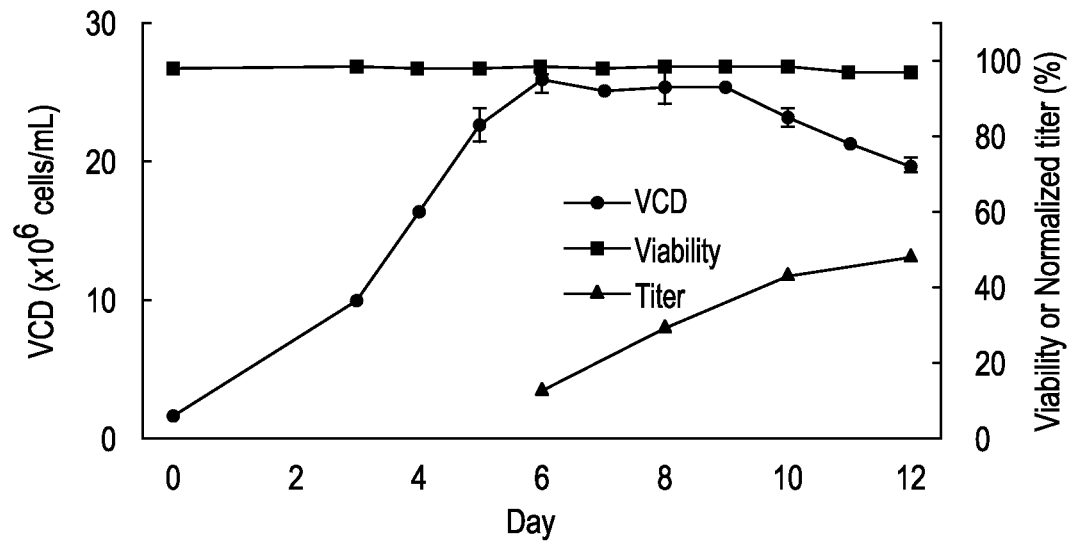
FIG. 11A and FIG. 11B show fed-batch cell culture performance profiles of VCD, viability and normalized titer (FIG. 11A) and metabolite profiles of glucose, lactate and ammonium levels (FIG. 11B) for mAb-8 production in 250-mL shake flasks.

Cell Culture Performance and Critical Quality Attributes Before and After in-vitro CpB Treatment for mAb-8 by an Industrial CHO GS Cell Line A platform fed-batch cell culture process was used for mAb-8 production by an industrial CHO GS cell line in 250-mL, shake flasks (n=3) with a duration of 12 days. The initial inoculation VCD was $1.65±0.13×10^6$ cells/mL (FIG. 11A). The peak VCD of 25.83 $0.71×10^6$ cells/mL was reached on day 6 and maintained at approximately $25×10^6$ cells/mL until day 9. The VCD then decreased from day 9 to 12, with a final VCD at $19.83±0.65×10^6$ cells/mL. The initial cell viability was 98.1±0.65%, which was maintained well throughout the entire duration with a final cell viability at 97.0±0.15% (FIG. 11A).

The normalized titer linearly increased from day 6 at 13.5±0.0% to day 10 at 43.1±0.0% with an average productivity of 7.41% normalized weight/L/day. Subsequently, titer gradually leveled off with a final normalized titer at 48.5±0.0% on day 12 and an average productivity of 2.69% between day 10 and 12 (FIG. 11A).

Figure 11B:
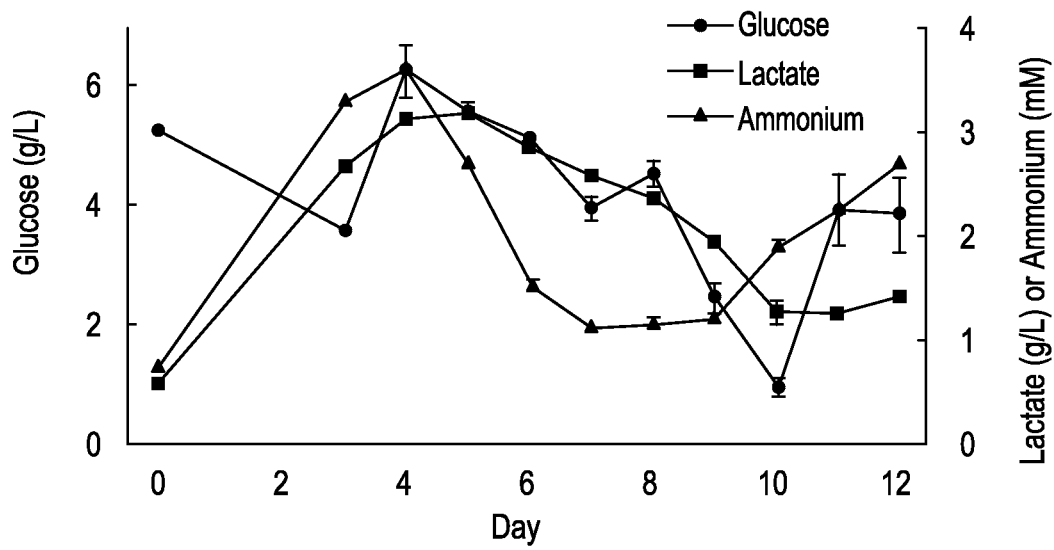

The metabolite profiles for the mAb-8 fed-batch production are shown in FIG. 11B. Glucose concentrations were maintained between 1 and 6 g/L for the entire duration. As expected, lactate increased during the early cell growth phase with a peak lactate concentration at 3.16±0.01 g/L on day 5, and then switched to the lactate consumption phase with a decreased concentration between 1.2-1.4 g/L from day 10 to 12 (FIG. 11B). Ammonium increased to a peak ammonium concentration at 3.60±0.02 mM on day 4 during the early cell growth phase, decreased to the lowest level of 1.12±0.04 mM on day 7, and gradually increased again from day 7 to 12 to a final concentration at 2.70±0.02 nM (FIG. 11B). This pattern of ammonium increasing during the early stages of cell culture, decreasing in the middle, and increasing again in the late phase is normal for fed-batch cell culture and agrees with our previous reports for different mAb production by other CHO cell lines (Xu et al. 2020b; Xu et al, 2020c).

Figure 12A:
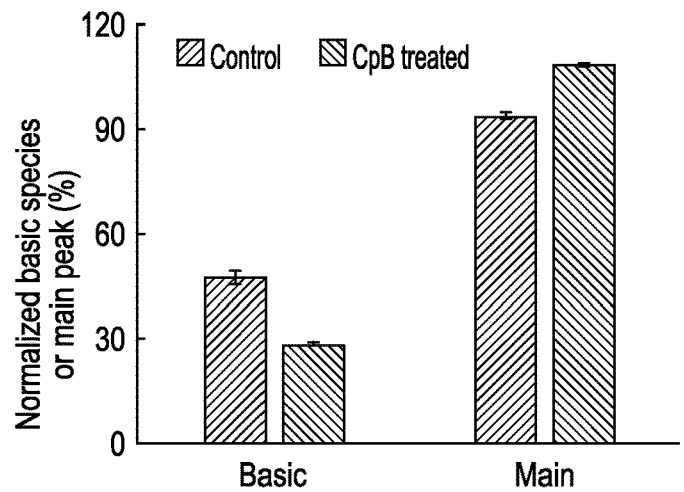
FIG. 12A, FIG. 12B and FIG. 12C show in-process quality attributes (levels of normalized basic charge variant species and normalized main peak, FIG. 12A; N glycans, including G0, G0F, G1F, G2F, and Man5, FIG. 12B; SEC impurities; including high molecular weight (HMW), low molecular weight (LMW), and monomer, FIG. 12C) for the whole cell culture control and CpB treated conditions at a CpB:mAb-8 ratio of 1:10,000 (w/w) for mAb-8 production in 250-mL shake flasks.
Figure 12B:
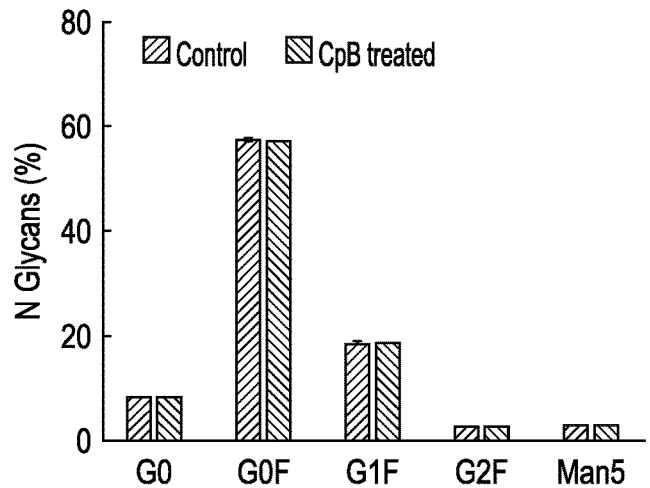
Figure 12C:
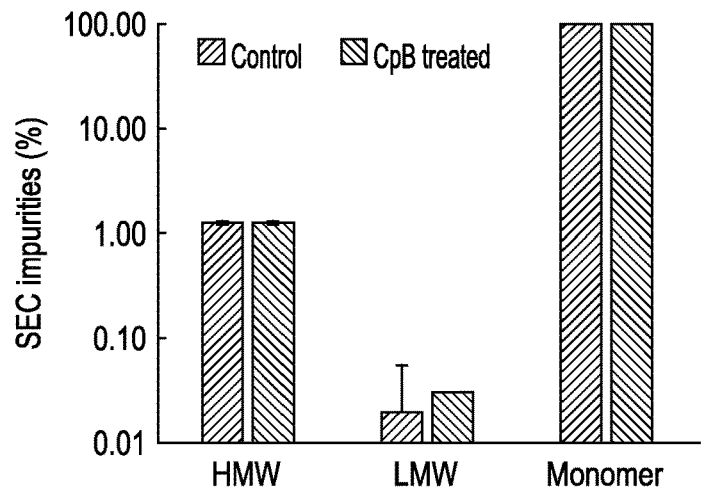

The charge variants and other critical quality attributes with and without the CpB treatment for mAb-8 production are shown in FIG. 12A, FIG. 12B and FIG. 12C (n=3). The control condition that was not subjected to the CpB treatment showed an average value of normalized basic species of 47.6±1.60%, Notably, normalized basic species were significantly reduced to 29.0±0.37% in the CpB-treated condition (p<0.0001) (FIG. 12A). A corresponding increase in the average value of normalized main peak to 108.8±0.31% was observed for the CpB-treated condition, a significant increase from the normalized main peak value of 93.9±1.12% exhibited by the control (p<0,0001) (FIG. 12A). Thus, the majority (14.8% out of 18.6%) of basic species reduced by the CpB treatment were converted to the main peak, while the remaining 3.8% of basic species reduced by the CpB treatment were converted to acidic species. Although the CpB treatment significantly increased main peak for mAb-8. SEC impurities (FIG. 12B) and N-glycans (FIG. 12C) were not affected by the treatment, indicating that this CpB treatment reduces basic charge variants of mAbs without impacting other critical quality attributes.

Figure 13A:
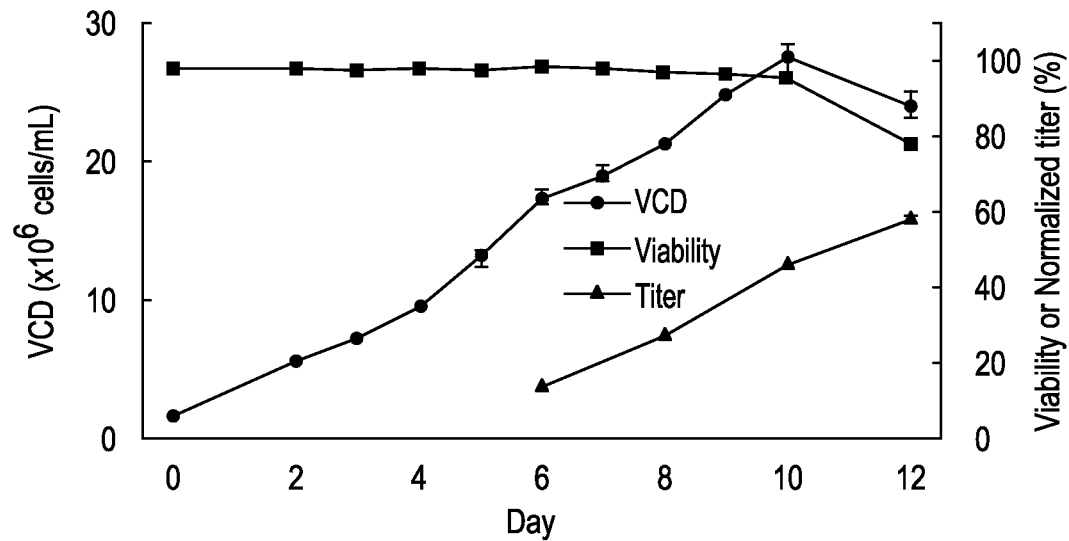
FIG. 13A and FIG. 13B show Fed-batch cell culture performance profiles of VCD, e.g., viability and normalized titer (FIG. 13A) and metabolite profiles of glucose, lactate and ammonium levels (FIG. 13B) during mAb-3 production in 250-mL shake flasks.

Cell Culture Performance and Critical Quality Attributes Before And After in-vitro CpB Treatment for mAb-3 by an Industrial CHO DG44 Cell Line As described in the Methods section, a similar platform fed-batch cell culture process in 250-mL: shake flasks (n=3) with a 12 day duration was used for mAb-3 as for mAh-8, except that mAb-3 was produced by an industrial CHO DG44 cell line with different seed and basal media than used for mAb-8. The initial inoculation VCD was $1.51±0.08×10°$ cells/ML and a peak VCD at $27.43±1.00×10°$ cells/mL was reached on day 10 (FIG. 13A). The VCD decreased from day 10 to 12 with a final VD) at $24.03±1.01×10^6$ cells/mL. The cell viability was 97.5±0.53% on day 0, which was maintained well throughout most of the culture duration with a cell viability at 94.6±0.62% on day 10. However, viability decreased from day 10 to harvest on day 12 with a final cell viability at 77.3±1.51% (FIG. 13A).

The normalized titer increased from day 6 at 13.5±0.0% to day 8 at 26.9±0.0% with an average productivity of 6.73% normalized weight/L/day, while the highest average productivity was observed at 9.43% between day 8 and 10. Average productivity levelled off between day 10 and 12 at 5.84% normalized weight/L/day alongside a final normalized titer of 57.5±0.8% (FIG. 13A).

Figure 13B:
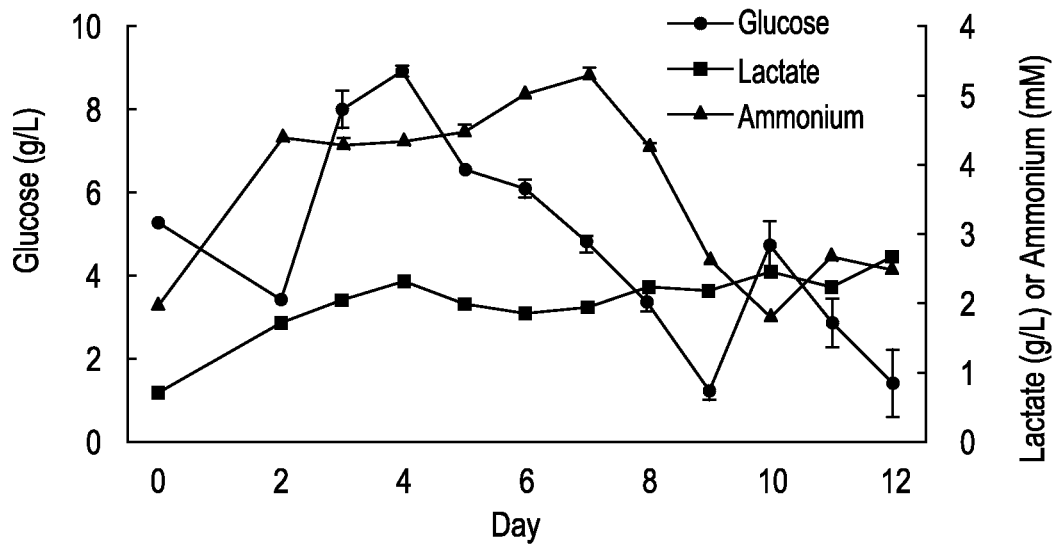

The metabolite profiles for the mAb-3 fed-batch production are shown in FIG. 13B, Glucose concentrations were maintained between 1 and 9 g/L for the entire duration. Lactate increased throughout the duration with a peak lactate concentration at 2.67±0.07 g/L for mAb-3 on day 12 (FIG. 13B), which was lower than the peak lactate at 3.16 g/L for mAb-8 (FIG. 11B). Although there was no lactate consumption phase for mAb-3, the peak lactate at 2.67 g/L was low, indicating that lactate itself should not impact the performance of the fed-batch cell culture. Ammonium increased to a peak concentration of 5.31±0.03 mM on day 7 during the early cell growth phase. Then, ammonium decreased to the lowest level at 1.76±0.02 mM on day 10 during the late cell growth phase, but slightly increased back to approximately 2.5 mM on day 11 and 12 (FIG. 13B).

Figure 14A:
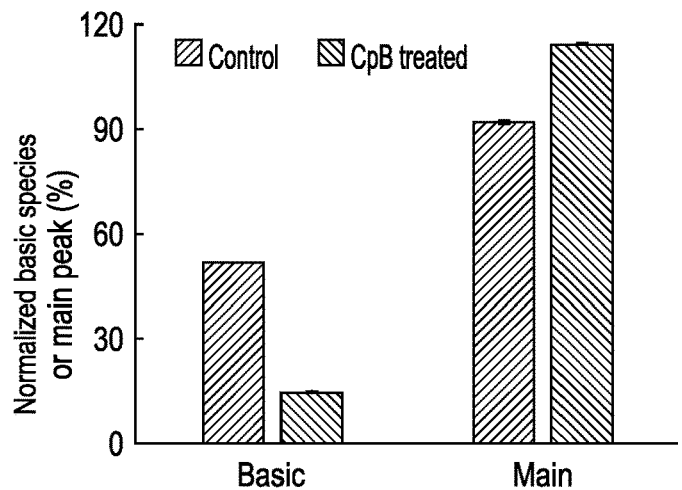
FIG. 14A, FIG. 14B and FIG. 14C show in-process quality attributes (levels of normalized basic charge variant species and normalized main peak, FIG. 14A; N glycans, including G0, G0F, GIF, G2F, and Man5, FIG. 14B, SEC impurities, including high molecular weight (HMW), low molecular weight (LMW), and monomer, FIG. 14C) for the whole cell culture control and CpB treated conditions at a CpB:mAb-3 ratio of 1:10,000 (w/w) for mAb-3 production in 250-mL shake flasks.

Similar to mAb-8, the in vitro CpB treatment of whole cell cultures increased the main peak of mAb-3 without impacting other critical quality attributes (FIG. 14A, FIG.

Figure 14B:
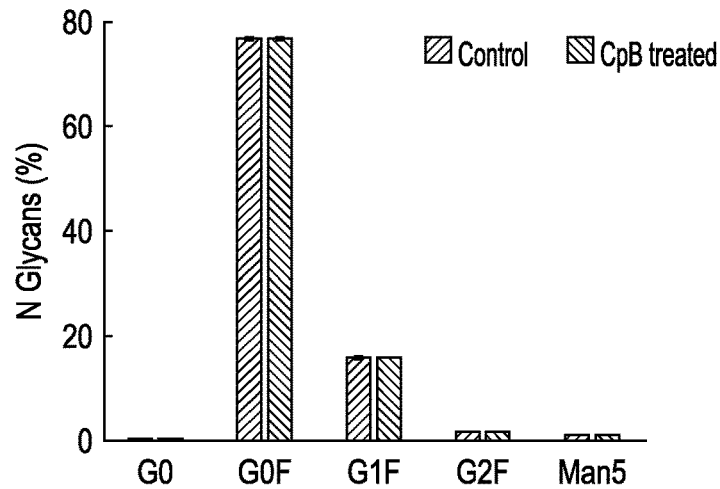
Figure 14C:
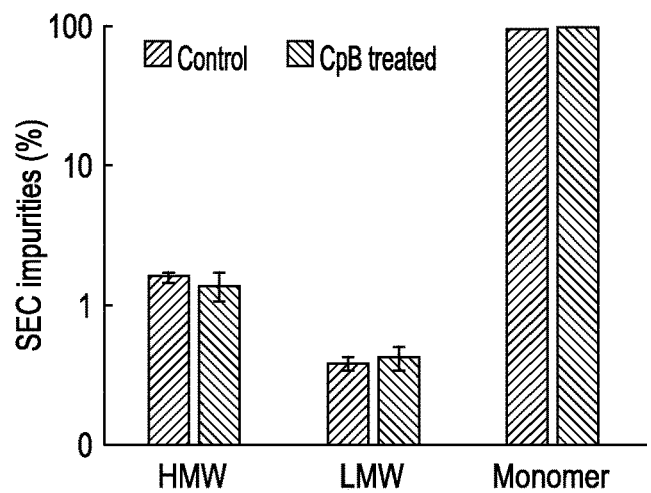

14B and FIG. 14C, n=3), The average value of normalized basic species was 14.3±0.44% for the CpB treated condition, which was significantly lower than 51.8±0.25% for the untreated control (p<0.0001) (FIG. 14A). Meanwhile, the average value of normalized main peak was 114.6±0.37% for the CpB treated condition, which was significantly higher than 92.1±0.51% for the control (p<0.001) (FIG. 14A). This indicated that 22.5% out of 37.5% of basic species were converted to main peak, while the remaining 15% of basic species were converted to acidic species after the CpB treatment. Crucially, although the CpB treatment significantly increased the main peak for mAb-3 relative to the untreated control, other critical quality attributes, including SEC impurities (FIG. 14B) and N-glycosylation (FIG. 14C), were unaffected by the CpB treatment.

We claim:

1. A method of producing a therapeutic protein of interest comprising a Fc domain, wherein the Fc domain contains a lysine residue at the C-terminus, the method comprising:
   a) culturing host cells expressing the protein under optimized culture conditions in a bioreactor for at least 6 days;
   b) adding a carboxypeptidase (CP) to the cultured cells;
   c) collecting clarified bulk; and
   d) subjecting the clarified bulk to a purification process.

2. The method of claim 1, wherein the productivity of the therapeutic protein of interest is improved.

3. The method of claim 1, wherein the carboxypeptidase is selected from Carboxypeptidase A (CPA), Carboxypeptidase B (CPB), Carboxypeptidase D (CPD), Carboxypeptidase H (CPH), Carboxypeptidase E (CPE), Carboxypeptidase M (CPM), Carboxypeptidase N (CPN), Carboxypeptidase T (CPT), Carboxypeptidase Y (CPY), Carboxypeptidase M32, Glutamate carboxypeptidase (GCP), Prolylarboxypeptidase (PCP), D-alanyl-D-alanine carboxypeptidase (AACP) or Procarboxypeptidase.

4. The method of claim 3, wherein the carboxypeptidase is carboxypeptidase B (CpB).

5. The method of claim 1, wherein the bioreactor is a production bioreactor.

6. The method of claim 1, wherein the cells are cultured for about 14 days.

7. The method of claim 1, wherein the carboxypeptidase is added to the cultured cells between 0 to 24 hours before harvest.

8. The method of claim 1, wherein the carboxypeptidase is added to the cultured cells about 2 hours before harvest.

9. The method of claim 1, wherein the cells are in a perfusion, a batch or a fed batch cell culture.

10. The method of claim 1, wherein the carboxypeptidase is added at a ratio between 0.0001% to 1% w/w of CP:the protein of interest.

11. The method of claim 1, wherein the protein is a Fc-fusion protein or an antibody.

12. The method of claim 11, wherein the antibody is a monoclonal antibody (mAb).

13. The method of claim 12, wherein the carboxypeptidase is added in an amount sufficient to reduce the basic species of the mAb of interest.

14. The method of claim 12, wherein the carboxypeptidase is added in an amount sufficient to increase the main species of the mAb of interest.

15. The method of claim 1, wherein the host cells are CHO cells.

16. The method of claim 11, wherein the antibody binds an antigen selected from the group consisting of PD-1, PD-L1, CTLA-4, LAG-3, TIGIT, GITR, CXCR4, CD73 HER2, VEGF, CD20, CD40, CD11a, tissue factor (TF), PSCA, IL-8, IL-13, EGFR, SARS-COV-2 spike protein, HER3, and HER4.

* * * * *